US011981176B2

(12) United States Patent
Hawkins

(10) Patent No.: US 11,981,176 B2
(45) Date of Patent: May 14, 2024

(54) ACTIVE SUSPENSION CONTROL SYSTEM FOR A MOTOR VEHICLE

(71) Applicant: Gene Hawkins, Ada, MI (US)

(72) Inventor: Gene Hawkins, Ada, MI (US)

( * ) Notice: Subject to any disclaimer, the term of this patent is extended or adjusted under 35 U.S.C. 154(b) by 128 days.

(21) Appl. No.: 17/667,947

(22) Filed: Feb. 9, 2022

(65) Prior Publication Data

US 2022/0250432 A1 Aug. 11, 2022

Related U.S. Application Data

(60) Provisional application No. 63/290,726, filed on Dec. 17, 2021, provisional application No. 63/147,812, filed on Feb. 10, 2021.

(51) Int. Cl.
*B60G 17/02* (2006.01)
*B60G 17/0165* (2006.01)
*B60G 17/019* (2006.01)

(52) U.S. Cl.
CPC ......... *B60G 17/02* (2013.01); *B60G 17/0165* (2013.01); *B60G 17/019* (2013.01)

(58) Field of Classification Search
CPC .............. B60G 17/0157; B60G 15/061; B60G 17/01908; B60G 17/021; B60G 17/08; B60G 15/065; B60G 17/06; B60G 2204/1242; B60G 2202/422; B60G 2600/182; B60G 2400/252; B60G 2400/202; B60G 2400/10;

(Continued)

(56) References Cited

U.S. PATENT DOCUMENTS

| 1,928,228 A | 9/1933 | Olley |
| 2,015,453 A | 9/1935 | Kindl et al. |
| 2,746,768 A | 5/1956 | Bowser |

(Continued)

FOREIGN PATENT DOCUMENTS

| CN | 101961975 A | 2/2011 |
| DE | 1257598 B | 12/1967 |

(Continued)

OTHER PUBLICATIONS

Klas, Wolff, et al., Objective Evaluation of Subjective Driving Impressions; Semantic Scholar; F2008-03-019.

(Continued)

*Primary Examiner* — Toan C To
(74) *Attorney, Agent, or Firm* — Barnes & Thornburg LLP

(57) ABSTRACT

An active damper is provided for a motor vehicle including a sprung mass, an unsprung mass coupled thereto and at least one wheel and tire combination coupled to the unsprung mass such that road terrain movement acting on the at least one wheel and tire combination along a z-axis induces movement of the unsprung mass along the z-axis which, in turn, induces movement of the sprung mass along the z-axis. The active damper may include a housing configured to be mounted to the unsprung mass, a damper mass received within the housing and movable relative to the housing, and an actuator configured to be responsive to a drive signal to cause the damper mass to move within the housing so as to cancel, or at least reduce, movement of the unsprung mass resulting from the road terrain movement.

17 Claims, 17 Drawing Sheets

(58) Field of Classification Search
CPC .......... B60G 2202/312; B60G 2202/12; B60G 2400/102; B60G 2202/40
See application file for complete search history.

(56) References Cited

U.S. PATENT DOCUMENTS

| | | | |
|---|---|---|---|
| 2,865,651 | A | 12/1958 | Chayne et al. |
| 2,901,239 | A | 8/1959 | Sethna |
| 4,518,154 | A | 5/1985 | Merkle |
| 4,635,892 | A | 1/1987 | Baker |
| 4,635,909 | A | 1/1987 | Gold |
| 4,647,025 | A | 3/1987 | Gold |
| 4,742,996 | A | 5/1988 | Gold |
| 4,871,189 | A | 10/1989 | Van Breemen |
| 4,923,038 | A | 5/1990 | Lizell |
| 4,929,874 | A | 5/1990 | Mizuno et al. |
| 4,960,290 | A | 10/1990 | Bose |
| 5,364,081 | A | 11/1994 | Hartl |
| 5,374,077 | A | 12/1994 | Penzotti et al. |
| 5,456,341 | A | 10/1995 | Garnjost et al. |
| 5,906,254 | A | 5/1999 | Schmidt et al. |
| 6,364,078 | B1 | 4/2002 | Parison et al. |
| 6,637,561 | B1 | 10/2003 | Collins et al. |
| 7,005,816 | B2 | 2/2006 | Hio et al. |
| 7,398,143 | B2 | 7/2008 | Stothers et al. |
| 8,127,900 | B2 | 3/2012 | Inoue |
| 8,579,311 | B2 | 11/2013 | Butlin, Jr. et al. |
| 8,584,820 | B2 | 11/2013 | Asahara et al. |
| 8,783,430 | B2 | 7/2014 | Brown |
| 8,914,154 | B2 | 12/2014 | Stothers |
| 8,938,333 | B2 | 1/2015 | Bose et al. |
| 9,102,209 | B2 | 8/2015 | Giovanardi et al. |
| 9,643,467 | B2 | 5/2017 | Selden et al. |
| 10,415,664 | B2 | 9/2019 | Toyohira et al. |
| 10,906,370 | B1 | 2/2021 | Hall et al. |
| 11,173,766 | B1 * | 11/2021 | Hall .................... B60G 17/0164 |
| 11,345,209 | B1 * | 5/2022 | Carter .................. B60G 21/055 |
| 2007/0028885 | A1 | 2/2007 | Stothers et al. |
| 2010/0131114 | A1 | 5/2010 | Stothers et al. |
| 2010/0204881 | A1 | 8/2010 | Muragishi et al. |
| 2013/0161921 | A1 | 6/2013 | Cheng et al. |
| 2013/0319807 | A1 | 12/2013 | Gartner |
| 2014/0005888 | A1 | 1/2014 | Bose et al. |
| 2016/0121685 | A1 | 5/2016 | Giovanardi et al. |
| 2018/0162187 | A1 * | 6/2018 | Trangbaek ....... B60G 17/01908 |
| 2019/0009631 | A1 * | 1/2019 | Furuta .................... B60G 17/08 |
| 2020/0171907 | A1 * | 6/2020 | Hall ........................ B60G 11/27 |
| 2020/0223274 | A1 | 7/2020 | Tucker et al. |
| 2022/0305870 | A1 * | 9/2022 | Toyohira ................ B60G 13/02 |
| 2022/0348256 | A1 * | 11/2022 | Melkote ............... B62D 15/026 |

FOREIGN PATENT DOCUMENTS

| | | |
|---|---|---|
| DE | 1630478 A1 | 5/1971 |
| DE | 69514246 T2 | 5/2000 |
| DE | 102009050683 A1 | 4/2011 |
| DE | 102010030700 A1 | 1/2012 |
| EP | 0160275 A2 | 11/1985 |
| EP | 0160276 A2 | 11/1985 |
| EP | 0200384 A2 | 11/1986 |
| EP | 0229902 B1 | 7/1989 |
| EP | 0344923 A1 | 12/1989 |
| FR | 2979586 B1 | 3/2014 |
| JP | 4396611 B2 | 1/2010 |
| KR | 101153579 B1 | 6/2012 |
| WO | 2011089373 A1 | 7/2011 |

OTHER PUBLICATIONS

Back to Basics—Ride Quality and Comfort; Diesel & Eco Car Magazine; Oct. 26, 2014; https://dieselcar.com/stuff/doctor/back-to-basics-ride-quality-and-comfort/.
Methodology to Quantitatively Evaluate the Secondary Ride Characteristics of a Vehicle; Sae Abstract; Jul. 10, 2017.
Ride, Handling and Driveability Sensors; PCB Peizotronics.
International Search Report and Written Opinion dated May 17, 2022 in International Application No. PCT/US22/15780 filed Feb. 9, 2022.

* cited by examiner

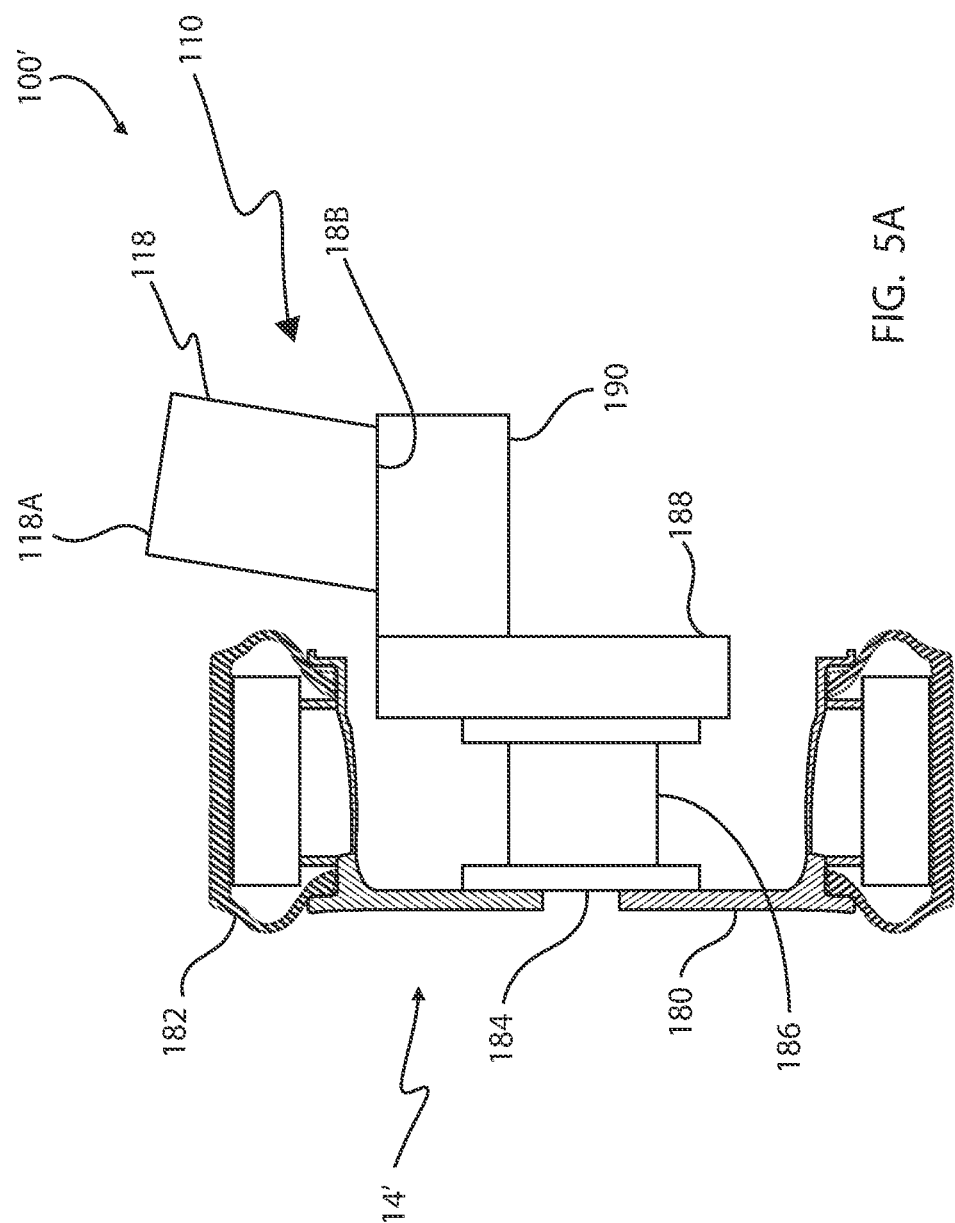

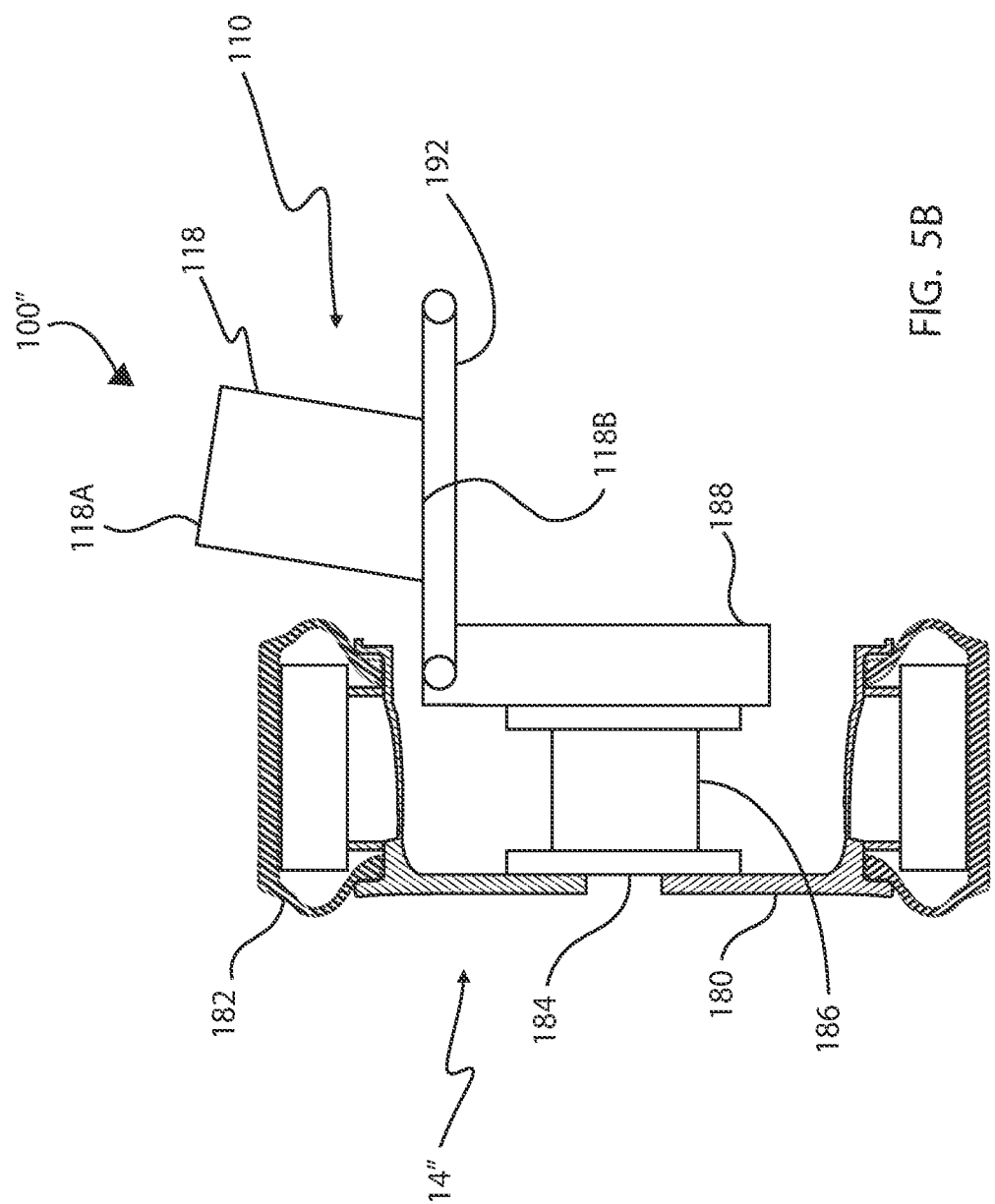

ACTIVE SUSPENSION CONTROL SYSTEM FOR A MOTOR VEHICLE

CROSS-REFERENCE TO RELATED APPLICATIONS

This is application claims the benefit of and priority to Provisional Patent Application No. 63/147,812, filed Feb. 10, 2021, and to Provisional Patent Application No. 63/290,726, filed Dec. 17, 2021, the disclosures of which are expressly incorporated herein by reference in their entireties.

TECHNICAL FIELD

The present disclosure relates generally to suspension control systems for motor vehicles, and further to such systems including active damping of transient movement of the unsprung mass of the motor vehicle and/or active damping of transient movement between the sprung mass and the unsprung mass of the motor vehicle.

BACKGROUND

With respect to conventional wheeled motor vehicles such as automobiles, trucks, all-terrain vehicles, motorcycles and the like, a combination of the chassis and body of the motor vehicle and all components carried thereby and/or mounted thereto is typically referred to as a so-called "sprung mass," and the sprung mass is generally coupled to a suspension system. The suspension system typically has a so-called "unsprung mass," which includes a combination of one or more axles, one or more wheels and all components carried thereby and/or mounted thereto, and one or more coupling components coupled to and between the sprung and unsprung masses. The unsprung mass of a wheeled motor vehicle is generally in contact with the ground or road via the one or more wheel and tire combination(s).

Referring to FIG. 1, an example of a conventional passive suspension system 10 is shown including a sprung mass 12, having a mass $M_1$, and an unsprung mass 14, having a mass $M_2$. The coupling components in the example passive suspension system 10 include a ride spring 16, typically modeled as a conventional spring having a spring coefficient $k_1$, and a separate passive damper 18, typically modeled as a conventional mechanical damper having a damper coefficient $b_1$, each coupled to and between the sprung mass 12 and the unsprung mass 14. In conventional passive suspension systems, the ride spring 16 may take the form of one or any combination of at least one coil spring, at least one leaf spring, at least one air spring and at least one torsion bar, and the passive damper 18 may take the form of one or more so-called "shock absorbers" or the like. The unsprung mass 14 is generally coupled to the ground 20 via one or more wheel and tire combination(s), and the one or more wheel and tire combination(s) are together typically modeled as a spring 22 having a spring coefficient $k_2$ and a damper 24 having a damper coefficient $b_2$, with each of the spring 22 and the damper 24 coupled to and between the unsprung mass 14 and the ground 20.

The terrain of the ground 20 may introduce movement $z_0$ into the suspension system 10, generally modeled along the z-axis, which may, in turn, induce corresponding movement $z_1$ in the unsprung mass 14 along the z-axis via the two or more wheel and tire combinations which may, in turn, induce corresponding movement $z_2$ in the sprung mass 12 along the z-axis. The primary purpose of the passive damper 18 in the passive suspension system 10 is to damp movement of the sprung mass 12 and the unsprung mass 14 induced by the terrain of the road 20 through the wheel and tire combination(s) 22, 24.

SUMMARY

The present disclosure may comprise one or more of the features recited in the attached claims, and/or one or more of the following features and combinations thereof. In a first aspect, an active suspension control system is provided for a motor vehicle including a sprung mass, an unsprung mass coupled to the sprung mass and at least one wheel and tire combination coupled to the unsprung mass such that road terrain movement acting on the at least one wheel and tire combination along a z-axis induces movement of the unsprung mass along the z-axis which, in turn, induces movement of the sprung mass also along the z-axis. The active suspension control system may comprise an active mass damper configured to be mounted to the unsprung mass, the active mass damper including a damper mass and an actuator responsive to a drive signal to cause the damper mass to move relative to the unsprung mass in a direction having a movement component acting along the z-axis, an actuator driver responsive to a control signal to produce the drive signal, at least one sensor configured to produce at least one sensor signal indicative of the component of movement of the unsprung mass along the z-axis, a control circuit, and a memory having instructions stored therein executable by the control circuit to cause the control circuit to produce the control signal based on the at least one sensor signal to control movement of the damper mass so as to cancel, or at least reduce, movement of the unsprung mass in response to the road terrain-induced movement acting on the unsprung mass via the at least one wheel and tire combination.

A second aspect may include the features of the first aspect, and wherein the at least one sensor may comprise a position sensor configured to produce a position signal corresponding to a position of the damper mass relative to the unsprung mass, and an acceleration sensor configured to produce an acceleration signal corresponding to an acceleration of the unsprung mass along the z-axis.

A third aspect may include the features of the second aspect, and wherein the instructions stored in the memory may include instructions executable by the control circuit to determine a velocity of the unsprung mass along the z-axis based on the acceleration signal or the position signal, and to produce the control signal based on the position signal and on the determined velocity of the unsprung mass.

A fourth aspect may include the features of any one or more of the first through third aspects, wherein the actuator may be configured to produce a feedback signal corresponding to a force applied to the mass by the actuator in response to the drive signal, and wherein the actuator driver may be configured to produce the drive signal based on the control signal and the feedback signal.

A fifth aspect may include the features of any one or more of the first through third aspects, wherein the actuator may be configured to produce a feedback signal corresponding to a force applied to the mass by the actuator in response to the drive signal, and wherein the instructions stored in the memory may include instruction executable by the control circuit to produce the control signal further based on the feedback signal.

A sixth aspect may include the features of any one or more of the first through fifth aspects, wherein the active mass damper may comprise a housing having a bottom end and a top end opposite the bottom end, the housing configured to be mounted to the unsprung mass, a rod received within the housing and coupled at top and bottom ends thereof to respective ones of the top and bottom ends of the housing, wherein the damper mass is slidably received on the rod and the rod is positioned relative to the unsprung mass such that movement of the damper mass along the rod and within the housing has a movement component which acts along the z-axis, a first coil spring received about the rod, and a second coil spring received about the rod, wherein the damper mass is positioned between the first and second coil springs such that a top of the damper mass is biased away from the top end of the housing by the first coil spring and is biased away from the bottom end of the housing by the second coil spring.

A seventh aspect may include the features of the sixth aspect, wherein the damper mass may be a magnet, and wherein the actuator may comprise an electrical coil attached to or integral with the housing such that activation of the electrical coil, in response to the drive signal, forces the magnet to move relative to the rod against the bias of the first or second coil spring.

An eighth aspect may include the features of the seventh aspect, wherein the housing may be cylindrical, and wherein the electrical coil may be attached to or integral with at least a portion of a sidewall of the housing between the top end and the bottom end of the housing, the electrical coil extending at least partially about a periphery of the housing.

A ninth aspect may include the features of any one or more of the first through the eighth aspects, and further may comprise a rechargeable power source electrically coupled to the driver circuit, wherein the actuator may be configured to convert kinetic energy of the unsprung mass to electrical energy, and wherein and the actuator and the actuator driver may be configured to route the electrical energy, converted by the actuator from the kinetic energy of the unsprung mass, to the rechargeable power source for recharging thereof.

A tenth aspect may include the features of any one or more of the first through the ninth aspects, wherein the system does not include a shock absorber coupled to and between the unsprung mass and the sprung mass, and wherein the system may include an air spring damper in lieu of the shock absorber, the air spring damper coupling the unsprung mass to the sprung mass.

An eleventh aspect may include the features of any one or more of the first through the tenth aspects, wherein the system does not include a ride spring coupled to and between the unsprung mass and the sprung mass, and wherein the system may include a multi-chamber air spring damper in lieu of the ride spring, the multi-chamber air spring damper coupling the unsprung mass to the sprung mass.

A twelfth aspect may include the features of any one or more of the first through ninth aspects, and may further comprise a force actuator coupling the unsprung mass to the sprung mass, the force actuator comprising a magnet coupled directly to one of the sprung mass and the unsprung mass, and an actuator including a housing attached to the other of the sprung mass and the unsprung mass, wherein the magnet of the force actuator may be disposed within and movable relative to the force actuator housing, and wherein the actuator of the force actuator may be configured to be responsive to a force actuator drive signal to cause the magnet of the force actuator to move relative to the force actuator housing to deliver a force between the sprung and unsprung masses along the z-axis which cancels, or at least reduces, movement of the sprung mass relative to the unsprung mass.

A thirteenth aspect may include the features of the twelfth aspect, and may further comprise a force actuator driver responsive to a force actuator control signal to produce the force actuator drive signal, at least one sensor configured to produce at least one force actuator sensor signal indicative of movement of the sprung mass along the z-axis, and wherein the memory may further have instructions stored therein executable by the control circuit, or wherein another memory has instructions stored therein executable by another control circuit, to cause the control circuit or the another control circuit to produce the force actuator control signal based on the at least one force actuator sensor signal to deliver the force so as to cancel, or at least reduce, movement of the sprung mass relative to the unsprung mass.

A fourteenth aspect may include the features of the twelfth or thirteenth aspects, wherein the force actuator further may include a rod or shaft having one end coupled directly to the one of the sprung mass and the unsprung mass, and an opposite end at or adjacent to which the magnet of the force actuator is affixed such that the rod or shaft and the magnet of the force actuator are together movable within and relative to the force actuator housing.

A fifteenth aspect may include the features of any one or more of the twelfth through fourteenth aspects, wherein the actuator of the force actuator may further comprise an electrical coil attached to or integral with the force actuator housing such that activation of the electrical coil of the force actuator, in response to the force actuator drive signal, forces the force actuator magnet to move within and relative to the force actuator housing.

A sixteenth aspect may include the features of the fifteenth aspect, wherein the force actuator housing may be cylindrical, and wherein the electrical coil of the force actuator may be attached to or integral with at least a portion of a sidewall of the force actuator housing between the top end and the bottom end of the force actuator housing, the electrical coil of the force actuator extending at least partially about a periphery of the force actuator housing.

A seventeenth aspect may include the features of the any one or more of the twelfth through sixteenth aspects, wherein the at least one force actuator sensor may comprise at least one of a position sensor configured to produce a displacement signal corresponding to relative displacement between the sprung and unsprung masses, and a sprung mass acceleration sensor may be configured to produce a sprung mass acceleration signal corresponding to an acceleration of the sprung mass along the z-axis, and wherein the instructions stored in the memory or the another memory may include instructions executable by the control circuit or the another control circuit to determine a velocity of the sprung mass along the z-axis based on the at least one of the displacement signal and the sprung mass acceleration signal, to determine a relative displacement between the sprung and unsprung masses based on the displacement signal, and to produce the force actuator control signal based at least on the determined velocity of the sprung mass, the determined velocity of the unsprung mass and the relative displacement between the sprung and unsprung masses.

An eighteenth aspect may include the features of the seventeenth aspect, and may further comprise a plurality of secondary ride components coupled between the sprung and unsprung masses in such a way as to act on the sprung and unsprung masses respectively with equal and opposite forces, and wherein the instructions stored in the memory or the another memory may include instructions executable by the control circuit or the another control circuit to estimate a force acting on the sprung mass by each of the plurality of secondary ride components based on the displacement signal, and to produce the force actuator control signal further based on a sum of the estimated forces acting on the sprung mass by the plurality of secondary ride components such that the force actuator delivers a force to the sprung mass which counteracts the sum of the estimated forces.

In a nineteenth aspect, an active suspension control system is provided for a motor vehicle including a sprung mass, an unsprung mass coupled to the sprung mass and at least one wheel and tire combination coupled to the unsprung mass such that road terrain movement acting on the at least one wheel and tire combination along a z-axis induces movement of the unsprung mass along the z-axis which, in turn, induces movement of the sprung mass also along the z-axis. The active suspension control system may comprise an active mass damper configured to be mounted to the unsprung mass, the active mass damper including a damper mass and an actuator responsive to a drive signal to cause the damper mass to move relative to the unsprung mass in a direction having a movement component acting along the z-axis, an actuator driver responsive to a control signal to produce the drive signal, means for determining at least one parameter indicative of movement of the unsprung mass along the z-axis, and a control circuit configured to produce the control signal based on the at least one determined parameter to control movement of the damper mass so as to cancel, or at least reduce, movement of the unsprung mass in response to the road terrain-induced movement acting on the unsprung mass via the at least one wheel and tire combination.

A twentieth aspect may include the features of the nineteenth aspect, wherein the means for determining at least one parameter indicative of movement of the damper mass along the z-axis may comprise means for determining a position of the damper mass relative to the unsprung mass, and means for determining a velocity of the unsprung mass, and wherein the control circuit may be configured to produce the control signal based on the determined position and velocity.

A twenty first aspect may include the features of the nineteenth or twentieth aspects, wherein the actuator may be configured to produce a feedback signal corresponding to a force applied to the mass by the actuator in response to the drive signal, and wherein the actuator driver may be configured to produce the drive signal based on the control signal and the feedback signal.

A twenty second aspect may include the features of any one or more of the nineteenth through twenty first aspects, wherein the actuator may be configured to produce a feedback signal corresponding to a force applied to the mass by the actuator in response to the drive signal, and wherein the control circuit may be configured to produce the control signal further based on the feedback signal.

A twenty third aspect may include the features of any one or more of the nineteenth through the twenty second aspects, wherein the active mass damper may comprise a housing having a bottom end and a top end opposite the bottom end, the housing configured to be mounted to the unsprung mass, a rod received within the housing and coupled at top and bottom ends thereof to respective ones of the top and bottom ends of the housing, the rod positioned relative to the unsprung mass such that movement of the rod within the housing has a movement component which acts along the z-axis, a first coil spring received about the rod, and a second coil spring received about the rod, wherein the damper mass is slidably received on the rod between the first and second coil springs such that a top of the damper mass is biased away from the top end of the housing by the first coil spring and is biased away from the bottom end of the housing by the second coil spring.

A twenty fourth aspect may include the features of the twenty third aspect, wherein the damper mass may be a magnet, and wherein actuator may comprise an electrical coil attached to or integral with the housing such that activation of the electrical coil, in response to the drive signal, forces the magnet to move relative to the rod against the bias of the first or second coil spring.

A twenty fifth aspect may include the features of the twenty fourth aspect, wherein the housing may be cylindrical, and wherein the electrical coil may be attached to or integral with at least a portion of a sidewall of the housing between the top end and the bottom end of the housing, the electrical coil extending at least partially about a periphery of the housing.

A twenty sixth aspect may include the features of any one or more of the nineteenth through twenty fifth aspects, and may further comprise a rechargeable power source electrically coupled to the driver circuit, wherein the actuator may be configured to convert kinetic energy of the unsprung mass to electrical energy, and wherein and the actuator and the actuator driver may be configured to route the electrical energy, converted by the actuator from the kinetic energy of the unsprung mass, to the rechargeable power source for recharging thereof.

A twenty seventh aspect may include the features of any one or more of the nineteenth through twenty sixth aspects, wherein the system does not include a shock absorber coupled to and between the unsprung mass and the sprung mass, and wherein the system may include an air spring damper in lieu of the shock absorber, the air spring damper coupling the unsprung mass to the sprung mass.

A twenty eighth aspect may include the features of any one or more of the nineteenth through twenty seventh aspects, wherein the system does not include a ride spring coupled to and between the unsprung mass and the sprung mass, and wherein the system may include a multi-chamber air spring damper in lieu of the ride spring, the multi-chamber air spring damper coupling the unsprung mass to the sprung mass.

A twenty ninth aspect may include the features of any one or more of the nineteenth through the twenty sixth aspects, and may further comprise a force actuator coupling the unsprung mass to the sprung mass, the force actuator comprising a magnet coupled directly to one of the sprung mass and the unsprung mass, and an actuator including a housing attached to the other of the sprung mass and the unsprung mass, wherein the magnet of the force actuator may be disposed within and movable relative to the force actuator housing, and wherein the actuator of the force actuator may be configured to be responsive to a force actuator drive signal to cause the force actuator magnet to move relative to the force actuator housing to deliver a force between the sprung and unsprung masses along the z-axis which cancels, or at least reduces, movement of the sprung mass relative to the unsprung mass.

A thirtieth aspect may include the features of the twenty ninth aspect, and may further comprise a force actuator driver responsive to a force actuator control signal to produce the force actuator drive signal, at least one sensor configured to produce at least one force actuator sensor signal indicative of movement of the sprung mass along the z-axis, and wherein the memory may further have instructions stored therein executable by the control circuit, or wherein another memory may have instructions stored therein executable by another control circuit, to cause the control circuit or the another control circuit to produce the force actuator control signal based on the at least one force actuator sensor signal to deliver the force so as to cancel, or at least reduce, movement of the sprung mass relative to the unsprung mass.

A thirty first aspect may include the features of the twenty ninth or thirtieth aspects, wherein the force actuator may further include a rod or shaft having one end coupled directly to the one of the sprung mass and the unsprung mass, and an opposite end at or adjacent to which the magnet of the force actuator is affixed such that the rod or shaft and the magnet of the force actuator are together movable within and relative to the force actuator housing.

A thirty second aspect may include the features of any one or more of the twenty ninth through thirty first aspects, wherein the actuator of the force actuator may further comprise an electrical coil attached to or integral with the force actuator housing such that activation of the electrical coil of the force actuator, in response to the force actuator drive signal, forces the force actuator magnet to move within and relative to the force actuator housing.

A thirty third aspect may include the features of the thirty second aspect, wherein the force actuator housing may be cylindrical, and wherein the electrical coil of the force actuator may be attached to or integral with at least a portion of a sidewall of the force actuator housing between the top end and the bottom end of the force actuator housing, the electrical coil of the force actuator extending at least partially about a periphery of the force actuator housing.

A thirty fourth aspect may include the features of any one or more of the twenty ninth through thirty third aspects, wherein the at least one force actuator sensor may comprise at least one of a position sensor configured to produce a displacement signal corresponding to relative displacement between the sprung and unsprung masses, and a sprung mass acceleration sensor configured to produce a sprung mass acceleration signal corresponding to an acceleration of the sprung mass along the z-axis, and wherein the instructions stored in the memory or the another memory may include instructions executable by the control circuit or the another control circuit to determine a velocity of the sprung mass along the z-axis based on the at least one of the displacement signal and the sprung mass acceleration signal, to determine a relative displacement between the sprung and unsprung masses based on the displacement signal, and to produce the force actuator control signal based at least on the determined velocity of the sprung mass, the determined velocity of the unsprung mass and the relative displacement between the sprung and unsprung masses.

A thirty fifth aspect may include the features of the thirty fourth aspect, and may further comprise a plurality of secondary ride components coupled between the sprung and unsprung masses in such a way as to act on the sprung and unsprung masses respectively with equal and opposite forces, and wherein the instructions stored in the memory or the another memory may include instructions executable by the control circuit or the another control circuit to estimate a force acting on the sprung mass by each of the plurality of secondary ride components based on the displacement signal, and to produce the force actuator control signal further based on a sum of the estimated forces acting on the sprung mass by the plurality of secondary ride components such that the force actuator delivers a force to the sprung mass which counteracts the sum of the estimated forces.

In a thirty sixth aspect, an active damper is provided for a motor vehicle including a sprung mass, an unsprung mass coupled to the sprung mass and at least one wheel and tire combination coupled to the unsprung mass such that road terrain movement acting on the at least one wheel and tire combination along a z-axis induces movement of the unsprung mass along the z-axis which, in turn, induces movement of the sprung mass also along the z-axis. The active damper may comprise a housing configured to be mounted to the unsprung mass, a damper mass received within the housing and movable within the housing in a direction, relative to the unsprung mass, which has a movement component acting along the z-axis, and an actuator configured to be responsive to a drive signal to cause the damper mass to within the housing so as to cancel, or at least reduce, movement of the unsprung mass in response to the road terrain-induced movement acting on the unsprung mass via the at least one wheel and tire combination.

A thirty seventh aspect may include the features of the thirty sixth aspect, wherein the housing has a top end and a bottom end opposite the top end, and wherein the active mass damper may further comprise a rod received within the housing and coupled at top and bottom ends thereof to respective ones of the top and bottom ends of the housing, the rod positioned relative to the unsprung mass such that movement of the rod within the housing has a movement component which acts along the z-axis, a first coil spring received about the rod, and a second coil spring received about the rod, wherein the damper mass may be slidably received on the rod between the first and second coil springs such that a top of the damper mass is biased away from the top end of the housing by the first coil spring and is biased away from the bottom end of the housing by the second coil spring.

A thirty eighth aspect may include the features of the thirty seventh aspect, wherein the damper mass may be a magnet, and wherein actuator may comprise an electrical coil attached to or integral with the housing such that activation of the electrical coil, in response to the drive signal, forces the magnet to move relative to the rod against the bias of the first or second coil spring.

A thirty ninth aspect may include the features of the thirty eighth aspect, wherein the housing may be cylindrical, and wherein the electrical coil may be attached to or integral with at least a portion of a sidewall of the housing between the top end and the bottom end of the housing, the electrical coil extending at least partially about a periphery of the housing.

BRIEF DESCRIPTION OF THE DRAWINGS

FIG. 5A is a simplified diagram of an embodiment of the active suspension system illustrated in FIGS. 2 and 3 depicting an example placement of the active damper within the active suspension system.

FIG. 5B is a simplified diagram of an embodiment of the active suspension system illustrated in FIGS. 2 and 3 depicting another example placement of the active damper within the active suspension system.

DESCRIPTION OF THE ILLUSTRATIVE EMBODIMENTS

For the purposes of promoting an understanding of the principles of this disclosure, reference will now be made to a number of illustrative embodiments shown in the attached drawings and specific language will be used to describe the same.

Figure 1:
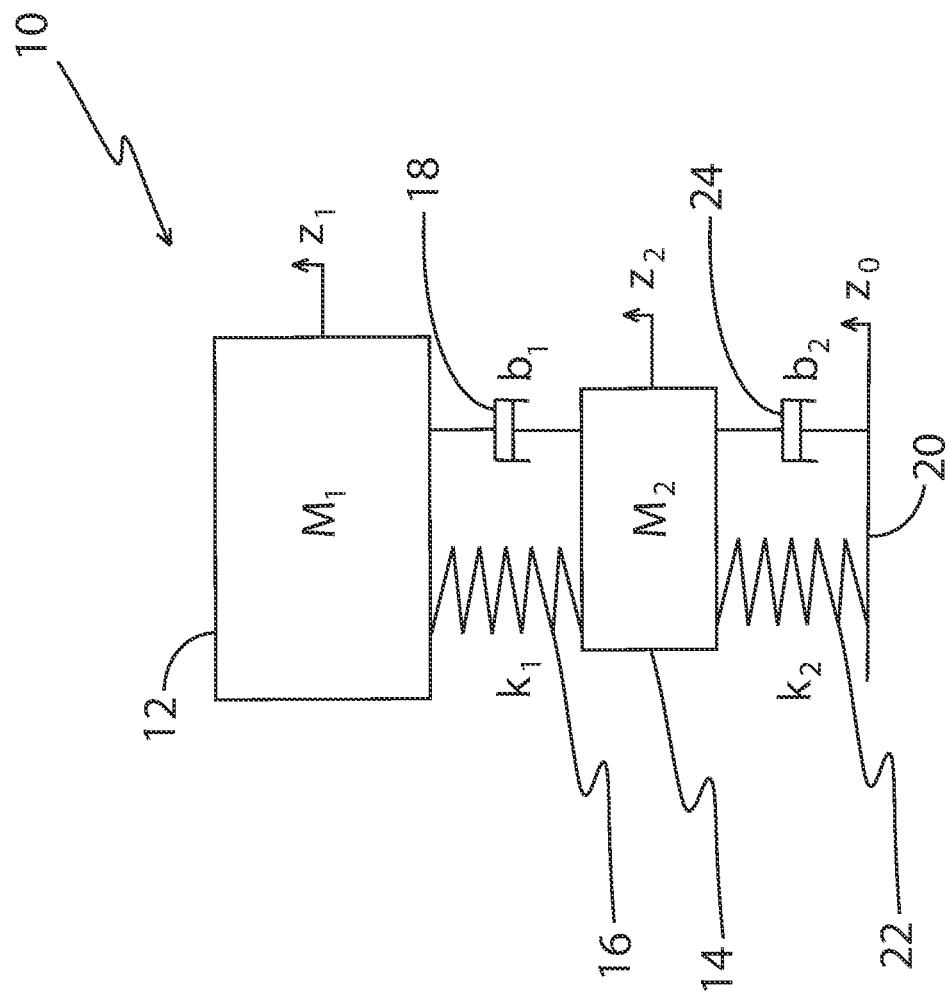
FIG. 1 is a simplified diagram of a conventional suspension system for a motor vehicle.
Figure 2:
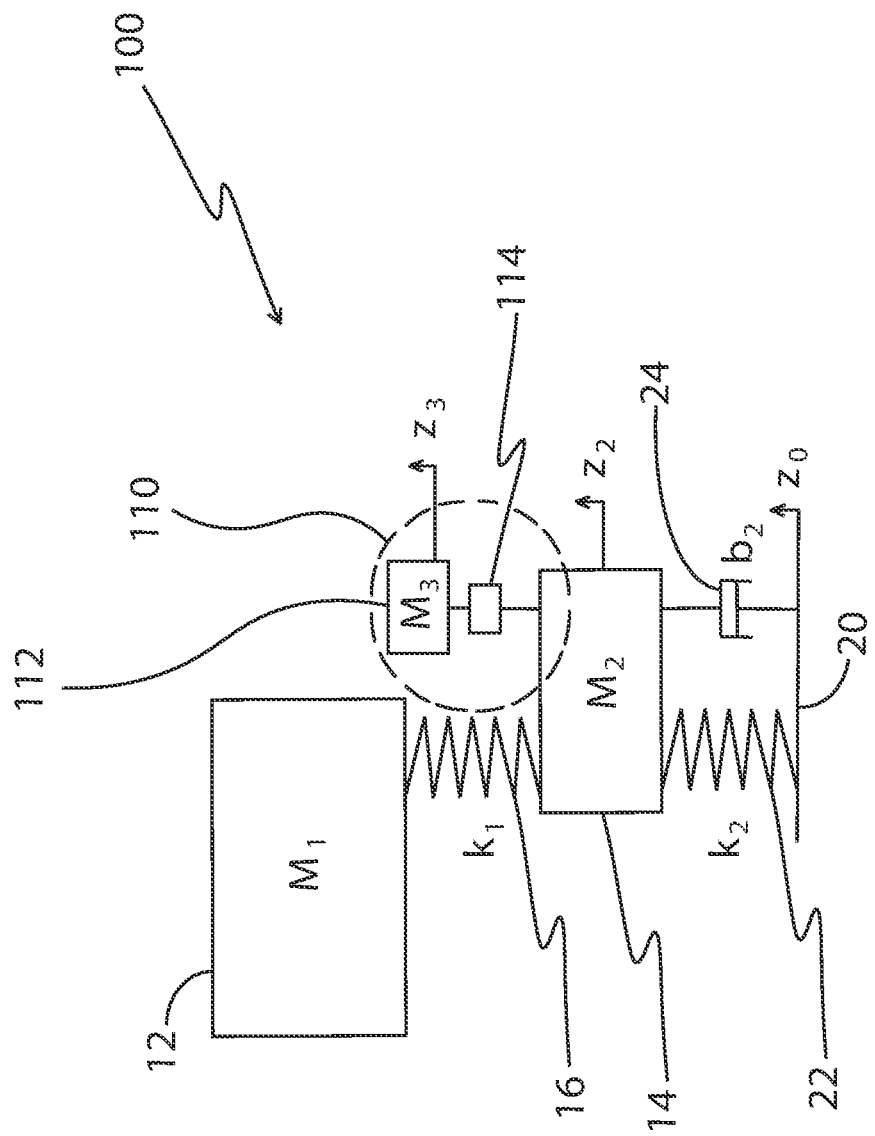
FIG. 2 is a simplified diagram of an embodiment of an active suspension system for a motor vehicle.

This disclosure relates to active suspension systems for motor vehicles in which one or more conventional passive coupling components is replaced by one or more active damping components. Referring now to FIG. 2, an embodiment is shown of an active suspension system 100 for a motor vehicle. In the illustrated embodiment, the active suspension system 100 includes many of the components of the passive suspension system 10 illustrated in FIG. 1 and described above, and like numbers are therefore used to identify like components. The active suspension system 100 illustrated by example in FIG. 2 illustratively differs from the passive suspension system 10 illustrate in FIG. 1 in that the passive damper 18 of the passive suspension system 10 is replaced in the active suspension system 100 by an embodiment of an active damper 110 coupled only to the unsprung mass 14; that is, the active damper 110 is not attached, mounted or otherwise mechanically coupled to the sprung mass 12, but rather is mechanically coupled only to the unsprung mass 14.

Figure 3:
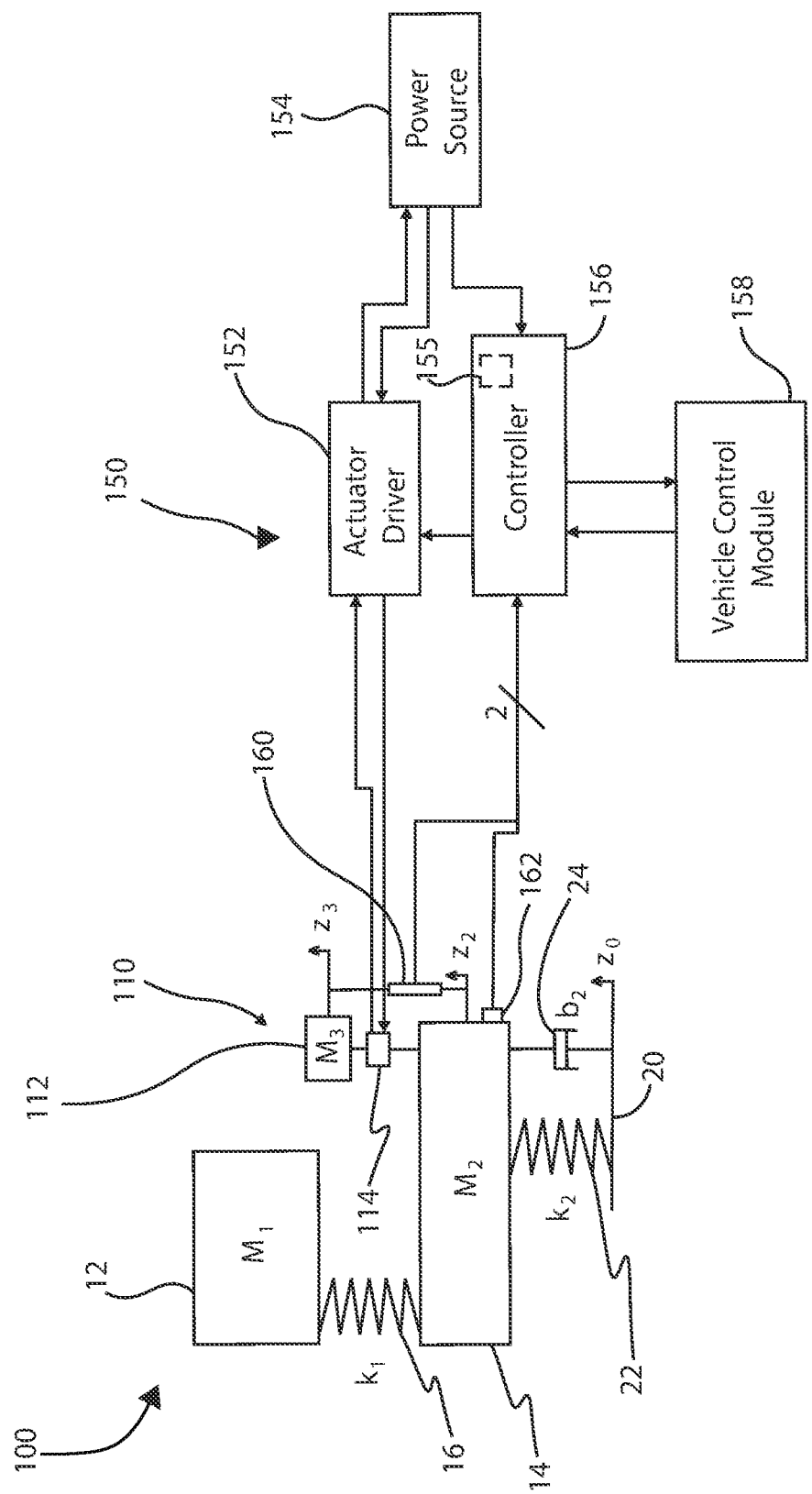
FIG. 3 is a simplified diagram of an embodiment of a control system operatively coupled to, and configured to control, an active suspension system of the type depicted in FIG. 2.

In the embodiment illustrated in FIG. 2, the active damper 110 includes a mass 112, having a mass value $M_3$, and an actuator 114 configured to selectively induce movement of the mass 112 in a direction, relative to the unsprung mass, which has a movement component $z_3$ acting along the z-axis in a direction that is generally opposite to the movement $z_2$ of the unsprung mass 14. Illustratively, such movement of the mass 112 effectively cancels, or at least reduces, movement of the sprung mass 12 induced by the road terrain-induced movement $z_2$ of the unsprung mass 14 transferred to the sprung mass 12 primarily via the ride spring(s) 16. In one embodiment, the actuator 114 may be electrically controlled, i.e., such that the actuator 114 is configured to be responsive to one or more electrical drive signals to selectively move, e.g., induce the movement of, the mass 112 relative to the unsprung mass 14, although in alternate embodiments the actuator 114 may alternatively or additionally be controlled mechanically, pneumatically, with pressurized gas or the like. It will be understood that while only one mass 112 and actuator 114 combination is shown in FIG. 2, the suspension system 100 may include any number of mass 112 and actuator 114 combinations. In one example embodiment in which the motor vehicle includes four wheel and tire combinations, which should not be considered to be limiting in any way, the suspension system 100 may include four such mass 112 and actuator 114 combinations, each mounted at or adjacent to a respective one of the four wheel and tire combinations Referring now to FIG. 3, an embodiment is shown of a control system 150 operatively coupled to the active suspension system 100 of FIG. 2. The control system 150 is illustratively configured to control operation of the actuator 114 in a manner which controls movement of the mass 112 relative to unsprung mass 14 so as to effectively cancel, or at least reduce, movement of the sprung mass 12 transferred thereto primarily via the ride spring(s) 16 by the movement $z_2$ of the unsprung mass 14 in response to road terrain-induced movement $z_0$ acting on the unsprung mass 14 via the wheel and tire combination(s) 22, 24. In the illustrated embodiment, the control system 150 illustratively includes an actuator driver 152 having at least one signal output connected to the actuator 114, wherein the actuator driver 152 is configured to produce at the signal output(s) at least one drive signal for driving the actuator 114 to a target drive value. In some embodiments, such as that illustrated in FIG. 3, at least one signal output of the actuator 114 is connected to the actuator driver 152, and in such embodiments the actuator 114 is configured to supply the actuator driver 152 with a feedback signal corresponding to a magnitude, amount or other measurable indicator of actuation being applied by the actuator 114 to the mass 112, in response to the at least one drive signal, to cause movement of the mass 112, e.g., voltage, current, force, torque, etc. In one example of this embodiment, the actuator driver 152 is illustratively provided in the form of a conventional servo driver which includes a conventional controller for processing the feedback signal as will be described in detail below. In some alternate embodiments in which processing of the feedback signal is carried out by one or more other control system components, or in which the actuator driver 152 is configured to drive the actuator 114 according to an open-loop control strategy or according to a strictly feedforward control strategy, the feedback signal path illustrated in FIG. 3 is either omitted (in the case of open-loop or strictly feedforward control) or connected to one or more other control system components and is not, in any case, connected to the actuator driver 152. In such embodiments, the actuator driver 152 may illustratively be provided in the form of one or more conventional electrical driver circuits and/or in the form of at least one custom, i.e., application specific, driver circuit.

A conventional electrical power source 154 provides electrical power to the actuator driver 152 via at least one signal path as illustrated by example in FIG. 3. In some embodiments, the electrical power source 154 may be a dedicated source of electrical power, i.e., to be used solely to provide electrical power to the control system 150, and in such embodiments the electrical power source 154 may be provided in the form of at least one conventional rechargeable or non-rechargeable battery and/or one or more other conventional electrical power sources. In alternate embodiments, the electrical power source 154 may be an existing electrical power source or electrical system on-board the motor vehicle and used to provide electrical power to one or more other motor vehicle electrical devices and/or systems. In some embodiments, another electrical signal path may be connected between the actuator driver 152 and the electrical power source 154, as illustrated by example in FIG. 3, for the purpose of recovering electrical energy by the electrical power source 154, e.g., for the purpose of recharging the electrical power source 154, during certain operating conditions of the control system 150 as will be described in greater detail below with respect to FIG. 7.

The control system 150 further includes a control circuit 156, e.g., in the form of a controller, which is electrically coupled to the actuator driver 152 and which also receives electrical power from the electrical power source 154. The controller 156 is further electrically coupled to an existing vehicle control module 158 carried by the motor vehicle and configured to control one or more operations of the motor vehicle and/or one or more components thereof. In the illustrated embodiment, the controller 156 is configured for two-way communications with the vehicle control module 158, although in alternate embodiments the controller 156 may be configured only for one-way communications with the vehicle control module 158, e.g., either strictly providing information to the vehicle control module 158 or strictly receiving information from the vehicle control module 158. In any case, the controller 156 is illustratively conventional and includes one or more memory devices 155 having instructions stored therein which are executable by the controller 156 to cause the controller 156 to produce at least one control signal to control operation of the actuator driver 152 as will be described in greater detail below with respect to FIG. 6. In some alternate embodiments, the controller 156 may be replaced by at least one conventional microprocessor and at least one conventional memory devices having instructions stored therein which are executable by the microprocessor(s) to control operation of the actuator driver 152. In other alternate embodiments, the controller 156 may be replaced by one or more conventional and/or application specific circuits and/or circuit components hardwired to control operation of the actuator driver 152.

The control system 150 further illustratively includes at least one sensor configured to produce at least one sensor signal indicative of movement of the damper mass 112 relative to the unsprung mass 14, and the control circuit 156 is, in turn, configured, e.g., programmed, to produce at least one control signal, based on the at least one sensor signal, to control the actuator driver 152 to produce at least one drive signal to drive the actuator 114. In the illustrated embodiment, the system 150 includes a position sensor 160 having a signal output electrically connected to a signal input of the controller 156. The position sensor 160 is illustratively configured to produce a position signal on the signal output thereof corresponding to a position of the mass 112 relative to the unsprung mass 14, i.e., from which the amount of the displacement of the mass 112 relative to the displacement $z_2$ along the z-axis of the unsprung mass 14 can be determined. In one embodiment, the position sensor 160 is a conventional displacement sensor. Some examples of the position sensor 160 may include, but are not limited to, a linear variable differential transformer (LVDT) or other conventional position sensor coupled to and between the mass 112 and the unsprung mass 14, an LVDT or other conventional sensor attached to or integrated into the actuator 114, at least one laser or other radiation-based sensor coupled to and between the mass 112 and a housing of the actuator 114 or the unsprung mass 14, at least one magnetic sensor coupled to and between the mass 112 and a housing of the actuator 114 or the unsprung mass 14, at least one ultrasonic sensor coupled to and between the mass 112 and a housing of the actuator 114 or the unsprung mass 14, or the like. In some alternate embodiments, the position sensor 160 may include two or more conventional position sensors each configured to produce a separate position signal, and the controller 156 may illustratively be configured in such embodiments compute the position of the mass 112 relative to the unsprung mass 14 using a combination of such two or more position signals. In other alternate embodiments, the position of the mass 112 relative to the unsprung mass 14 may be estimated, e.g., according to one or more conventional models, based, at least in part, on information provided by one or more other types of sensors, examples of which may include, but are not limited to, inductance feedback from electrical coils of the actuator 114, at least one strain gage mounted to or integral with one or more springs coupled between the mass 112 and the housing of the actuator 114 or the unsprung mass 14, at least one pressure sensor positioned between the one or more springs and the housing of the actuator or the unsprung mass 14, or the like.

The control system 150 further illustratively includes an acceleration sensor 162 mounted to the unsprung mass 14 and having a signal output electrically connected to another signal input of the controller 156. The acceleration sensor 162 is illustratively configured to produce an acceleration signal on the signal output thereof corresponding to acceleration of the unsprung mass 14 during movement $z_2$ of the unsprung mass 14 along the z-axis in response to road terrain-induced movement $z_0$ acting on the unsprung mass 14 via the wheel and tire combination(s) 22, 24. In one embodiment, the acceleration sensor 162 is a conventional accelerometer operatively mounted to the unsprung mass 14. In some alternate embodiments, the acceleration sensor 162 may include two or more such accelerometers, and the controller 156 is illustratively operable to determine the acceleration of the unsprung mass 14 as a function of signal(s) produced by one or any combination of such two or more accelerometers. In other alternate embodiments, the acceleration of the unsprung mass 14 may be estimated, e.g., according to one or more conventional models, based, at least in part, on information provided by one or more other types of sensors, examples of which may include, but are not limited to, at least one position sensor mounted between the sprung mass 12 and the unsprung mass 14 (wherein the controller 156 is operable to determine acceleration of the unsprung mass 14 by twice differentiating the position sensor signal), a pressure sensor carried within the tire (wherein the controller 156 is operable to determine acceleration of the unsprung mass 14 as a function of the dynamic pressure changes within the tire), a pressure sensor mounted to and between the spring 16 and the sprung mass 12 and/or a pressure sensor mounted to and between the spring 16 and the unsprung mass 14 (wherein the controller 156 is operable to determine acceleration of the unsprung mass 14 as a function of the dynamic pressure changes resulting from action of the spring 16), a strain gage mounted to the coil spring 16 (wherein the controller 156 is operable to determine acceleration of the unsprung mass 14 as a function of the spring 16 acting on the strain gage), or the like.

As described more fully below with respect to FIG. 6, the control system 150 may further illustratively determine and utilize the velocity of the unsprung mass 14 in the control of the actuator 114. In one embodiment, as depicted by example in FIG. 6, the velocity of the unsprung mass 14 along the z-axis is computed by the controller 156 by integrating the measured (or estimated) acceleration of the unsprung mass 14. In embodiments in which the control system 150 includes an accelerometer 162 operatively mounted to the unsprung mass 14 as illustrated by example in FIG. 3, the controller 156 is illustratively operable to compute the velocity of the unsprung mass 14 by integrating the acceleration signal produced by the accelerometer 162. In some alternate embodiments, the velocity of the unsprung mass 14 may be estimated, e.g., according to one or more conventional models, based, at least in part, on information provided by one or more other types of sensors, examples of which may include, but are not limited to, at least one position sensor mounted between the sprung mass 12 and the unsprung mass 14 (wherein the controller 156 is operable to determine the velocity of the unsprung mass 14 by differentiating the position sensor signal), a pressure sensor carried within the tire (wherein the controller 156 is operable to determine the velocity of the unsprung mass 14 by integrating the pressure sensor signal), a pressure sensor mounted to and between the spring 16 and the sprung mass 12 and/or a pressure sensor mounted to and between the spring 16 and the unsprung mass 14 (wherein the controller 156 is operable to determine velocity of the unsprung mass 14 by integrating the pressure sensor signal), a strain gage mounted to the coil spring 16 (wherein the controller 156 is operable to determine velocity of the unsprung mass 14 by integrating the strain gage signal), or the like.

Figure 4:
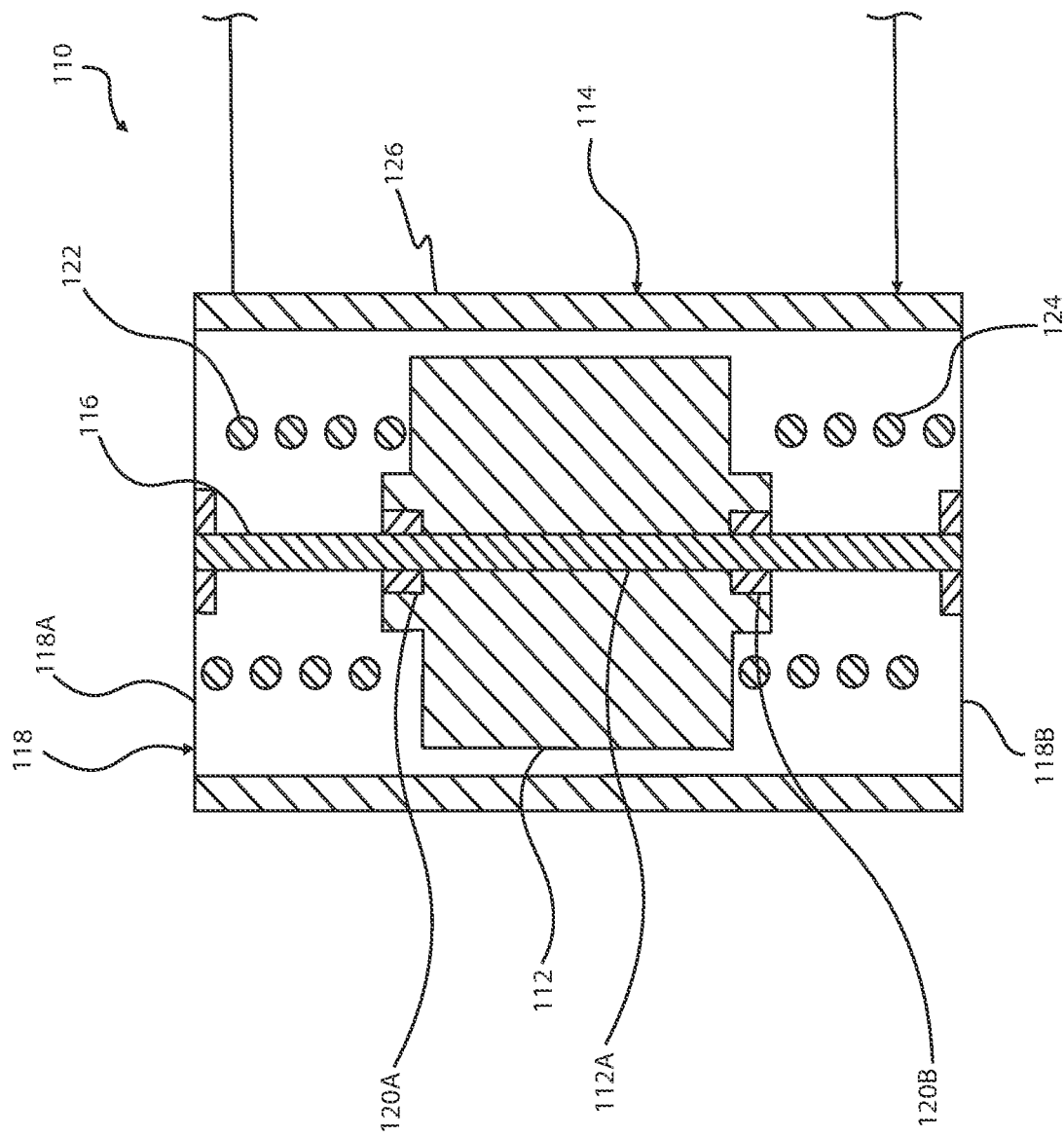
FIG. 4 is a simplified longitudinal cross-sectional view of an embodiment of the actuator of the active damper illustrated in FIG. 3 as viewed along a plane bisecting the actuator centrally through the z-axis.

Referring now to FIG. 4, a simplified longitudinal cross-sectional view is shown of an embodiment of the active damper 110 illustrated in FIG. 3. In the embodiment illustrated in FIG. 3, the active damper 110 is mounted to the unsprung mass 14 such that the mass 112 moves along the z-axis, i.e., vertically, relative to the unsprung mass 14, and in this embodiment FIG. 4 represents a cross-sectional view of the active damper 110 as viewed along a plane bisecting the active damper 110 centrally through the z-axis. In alternate embodiments, as will be described below, the active damper 110 may be mounted to, or otherwise operatively coupled to, the unsprung mass 14 such that the mass 112 moves along a movement axis that is not parallel with the z-axis but is rather disposed at an angle relative to the z-axis. In such embodiments, the movement of the mass 112 along the movement axis will be the sum of a movement component of the mass 112 along the z-axis and a movement component of the mass 112 along an axis perpendicular to the z-axis, i.e., a horizontal axis, wherein both movement components will be a function of the angle of the movement axis relative to the z-axis. In such embodiments, the position sensor 160 may be positioned relative to the mass 112 so as to sense movement of the mass 112, relative to the unsprung mass 14, along the movement axis, in which case the signal produced by the position sensor 160 will be processed by the controller 156 in a manner that takes into account the angle of the movement axis relative to the z-axis in order to determine the velocity component of the mass 112 along the z-axis. In other embodiments, the position sensor 160 may be positioned relative to the mass 12 so as to sense the movement component of the mass 112, relative to the unsprung mass 14, along the z-axis, and in such embodiments the signal produced by the position sensor 160 will correspond directly to position and movement of the mass 112, relative to the unsprung mass 14, along the z-axis.

In the embodiment illustrated in FIG. 4, the actuator 114 of the active damper 110 is provided in the form of an electrical coil-based actuator which incorporates the active damper mass 112 therein. A rod or shaft 116 extends longitudinally and centrally through an elongated, hollow housing 118. Top and bottom ends of the rod or shaft 116 are affixed to the housing 118 at the top and bottom ends 118A, 118B of the housing respectively, and the mass 112 is provided in the form of a magnet, e.g., a permanent magnet, defining a channel or bore 112A centrally therethrough sized to slidingly receive the rod or shaft 116 therein and therethrough. Bearings 120A, 120B engage the rod or shaft 116 and the magnet 112 at opposite top and bottom ends of the magnet 112. A top coil spring 122 is positioned between and against the top of the magnet 112 and the top end 118A of the housing 118, and a bottom coil spring 124 is positioned between and against the bottom of the magnet 112 and the bottom end 118B of the housing 118. The magnet 112 is thus slidably received on the rod 115 between the coil springs 122, 124 such that the top of the magnet 112 is biased away from the top end 118A of the housing 118 by the top coil spring 122 and the bottom of the magnet 112 is biased away from the bottom end 118B of the housing 118 by the bottom coil spring 124. The springs 122, 124 are illustratively equal in length and biasing force so as to center the magnet 112 in the housing 112 with the actuator 114 in an unactuated state as depicted by example in FIG. 4. An electrical coil 126 at least partially surrounds the magnet 112 along an outer surface of the housing 118, and the electrical coil 126 is electrically connected to the actuator driver 152 of the control system 150 illustrated by example in FIG. 3. In one embodiment, the electrical coil 126 is attached to the housing 118, although in alternate embodiments the electrical coil 126 may be integral with the housing 118. In some embodiments, the housing 118 is cylindrical, and the electrical coil 126 is attached to or integral with at least a portion of the sidewall of the housing 118 between the top and bottom ends 118A, 118B and extends at least partially about a periphery of the housing 118. In some embodiments, the electrical coil 126 extends to and between the ends 118A, 118B of the housing 118 and/or extends completely about the periphery of the housing 118. In any case, activation of the electrical coil 126, in response to a drive signal produced by the actuator driver 152, forces the magnet 112 to move along and relative to the rod 116 against, and overcoming, the bias of the top spring 122 and/or the bottom spring 124.

The bottom end 118B of the housing 118 is mounted or otherwise operatively coupled to the unsprung mass 14, and the magnet 112, i.e., the active damper mass, can be driven along the rod or shaft 116 against the biases of the upper and lower springs 122, 124 respectively by selectively activating an electrical coil 126. The electrical coil 126 is illustratively a current-driven coil wherein the linear force acting on the magnet 112 along the rod or shaft 116 is proportional to the magnitude of the drive current applied to the coil 126. In one embodiment, the magnet 112 can be driven downwardly along the rod or shaft 116 against the bias of the coil spring 124 by driving the electrical coil 126 with a negative current and can be driven upwardly along the rod or shaft 116 against the bias of the coil spring 122 by driving the electrical coil 126 with a positive current, although in alternate embodiments the magnet 112 can be driven upwardly with a negative current and downwardly with a positive current. In any case, the switching speed of the electrical coil 126 is illustratively selected to be at least as fast as the fastest expected transient movement of the unsprung mass 14 in response to road terrain-induced movement $z_0$ acting on the unsprung mass 14 via the wheel and tire combination(s) 22, 24. It will be understood that whereas the actuator 114 is depicted in FIG. 4 and described herein as a linear actuator, i.e., in which the mass 112 moves linearly along the rod or shaft 116, this disclosure contemplates alternate embodiments in which the actuator 114 is or includes a non-linear actuator, i.e., in which the mass 112 moves non-linearly or piecewise linearly.

The mass of the magnet 112 is illustratively selected so as to effectively cancel, or at least reduce, movement of at least a portion of the sprung mass 12 along the z-axis by the movement $z_2$ of the unsprung mass 14 in response to road terrain-induced movement $z_0$ acting on the unsprung mass 14 via the wheel and tire combination(s) 22, 24, as movement of the magnet 112 is driven by the actuator 114 along the rod or shaft 116 relative to the unsprung mass 14. In this regard, it will be understood that at least one dedicated actuator 114 will typically be placed at or near each wheel of the motor vehicle so that the combined mass of the multiple active damper magnets 112 will be selected to cancel or at least reduce vertical movement of the sprung mass 12. Generally, each actuator 114 will be accompanied by a dedicated set of sensors 160, 162 and a dedicated actuator driver 152, i.e., a set of sensors 160,162 and driver 152 for each of the plurality of actuators 114. In some alternate embodiments, the actuator driver 152 may be provided in the form of a single driver module having multiple different driver sections; one for each of the plurality of actuators 114. In one embodiment, a single controller 156 will be used to control each of the actuators 114, although in some alternate embodiments each actuator 114 may be controlled by a different, dedicated controller 156.

Referring now to FIG. 5A, a simplified diagram is shown of an embodiment 100' of the active suspension system 100 illustrated in FIGS. 2 and 3 depicting one example placement of the active damper 110 within the active suspension system 100'. In the example illustrated in FIG. 5A, a wheel 180 and tire 182 combination is operatively mounted to a conventional wheel bearing 186 via a conventional wheel hub 184 (which may or may not be or include a conventional brake system), and the wheel bearing 186 is, in turn, mounted to a conventional suspension knuckle 190 via a conventional coupling member 188. In this embodiment, the unsprung mass 14' includes, but is not limited to, the components 184, 186, 188 and 190. In any case, the bottom end 18B of the housing 118 of the active damper 110, in the illustrated example, is mounted to the suspension knuckle 190 such that the active damper mass 112 is suspended via the actuator 114 above the suspension knuckle 190. As described above, the active damper 110 may be mounted relative to the suspension knuckle 190 such that the mass 112 moves along or parallel with the z-axis, or may be mounted such that the mass 112 moves along a movement axis that forms an angle with the z-axis.

Referring now to FIG. 5B, a simplified diagram is shown of another embodiment 100'' of the active suspension system 100 illustrated in FIGS. 2 and 3 depicting another example placement of the active damper 110 within the active suspension system 100''. In the example illustrated in FIG. 5B, the wheel 180 and tire 182 combination is again operatively mounted to a conventional wheel bearing 186 via a conventional wheel hub 184. In this example, the wheel bearing 186 is, in turn, mounted to a conventional control arm 192 via a conventional coupling member 188. In this embodiment, the unsprung mass 14'' includes, but is not limited to, the components 184, 186, 188 and 192. In any case, the bottom end 18B of the housing 118 of the active damper 110, in the illustrated example, is mounted to the control arm 192 such that the active damper mass 112 is suspended above the control arm 192. As described above, the active damper 110 may be mounted relative to the control arm 192 such that the mass 112 moves along or parallel with the z-axis, or may be mounted such that the mass 112 moves along a movement axis that forms an angle with the z-axis.

Figure 5C:
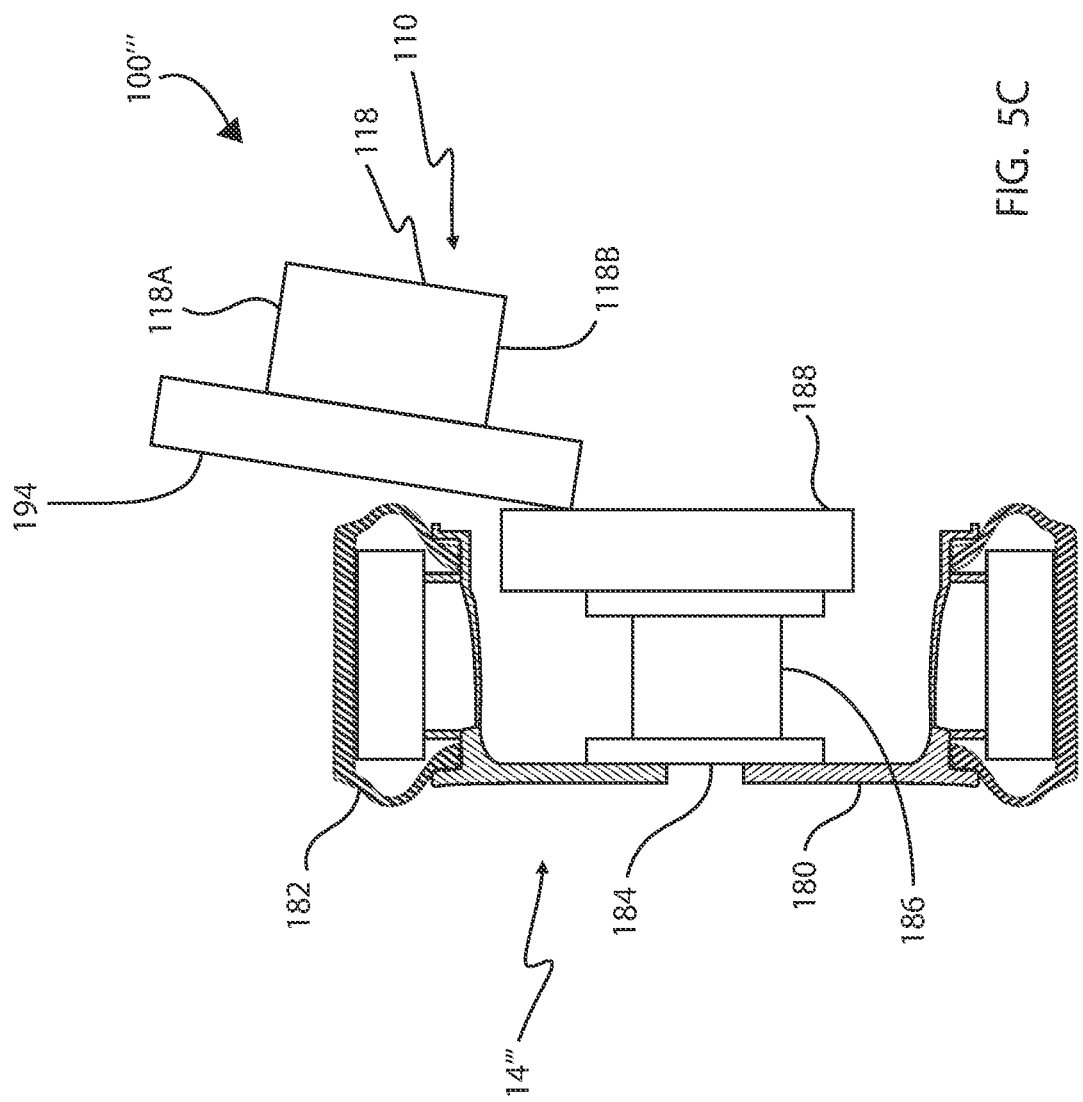
FIG. 5C is a simplified diagram of an embodiment of the active suspension system illustrated in FIGS. 2 and 3 depicting yet another example placement of the active damper within the active suspension system.

Referring now to FIG. 5C, a simplified diagram is shown of yet another embodiment 100''' of the active suspension system 100 illustrated in FIGS. 2 and 3 depicting yet another example placement of the active damper 110 within the active suspension system 100'''. In the example illustrated in FIG. 5C, the wheel 180 and tire 182 combination is again operatively mounted to a conventional wheel bearing 186 via a conventional wheel hub 184. In this example, the wheel bearing 186 is, in turn, mounted to a conventional MacPherson strut 194 via a conventional coupling member 188. In this embodiment, the unspring mass 14''' includes, but is not limited to, the components 184, 186, 188 and 194. In any case, the housing 118 of the active damper 110, in the illustrated example, is mounted laterally to the MacPherson strut 194 such that the active damper mass 112 is suspended via a side of the housing 118 in parallel with the MacPherson strut 194. As described above, the active damper 110 may be mounted relative to the MacPherson strut 194 such that the mass 112 moves along or parallel with the z-axis, or may be mounted such that the mass 112 moves along a movement axis that forms an angle with the z-axis.

It will be understood that the example placements of the active damper 110 illustrated in FIGS. 5A-5C are intended to be merely illustrative, and that other placements of the active damper 110 on or along the unsprung mass 14 are contemplated by this disclosure. Those skilled in the art will recognize other such placements, and it will be understood that all such other placements are intended to fall within the scope of this disclosure. In these any other embodiments, the active damper 110 may be mounted such that the mass 112 moves along the z-axis, i.e., moves along the rod or shaft 116 in a direction parallel with the z-axis. In alternate embodiments, as described above, the active damper 110 may be mounted such that the mass 112 moves along a movement axis that is not parallel with the z-axis but rather positioned at an angle relative to the z-axis. In such embodiments, the movement of the mass 112 along the movement axis will be the sum of a movement component of the mass 112 along the z-axis and a movement component of the mass 112 along an perpendicular to the z-axis, i.e., a horizontal axis, wherein both movement components will be a function of the angle of the movement axis relative to the z-axis. In such embodiments, movement of the mass 112 along the rod or spring 116 and relative to the unsprung mass 14 will be in a direction that has one movement component acting along the z-axis and another movement component acting along the horizontal axis, and it is the movement component acting along the z-axis that is controlled by the controller 156 to counteract the movement of the unsprung mass 14. In such embodiments, the position sensor 160 may be positioned relative to the mass 112 so as to sense movement of the mass 112, relative to the unsprung mass 14, along the movement axis, in which case the signal produced by the position sensor 160 will be processed by the controller 156 as just described to determine the velocity component of the mass 112 along the z-axis, i.e., of the movement component acting along the z-axis. In other embodiments, the position sensor 160 may be positioned relative to the mass 12 so as to sense the movement component of the mass 112, relative to the unsprung mass 14, along the z-axis, and in such embodiments the signal produced by the position sensor 160 will correspond directly to position and movement of the mass 112, relative to the unsprung mass 14, along the z-axis.

Figure 6:
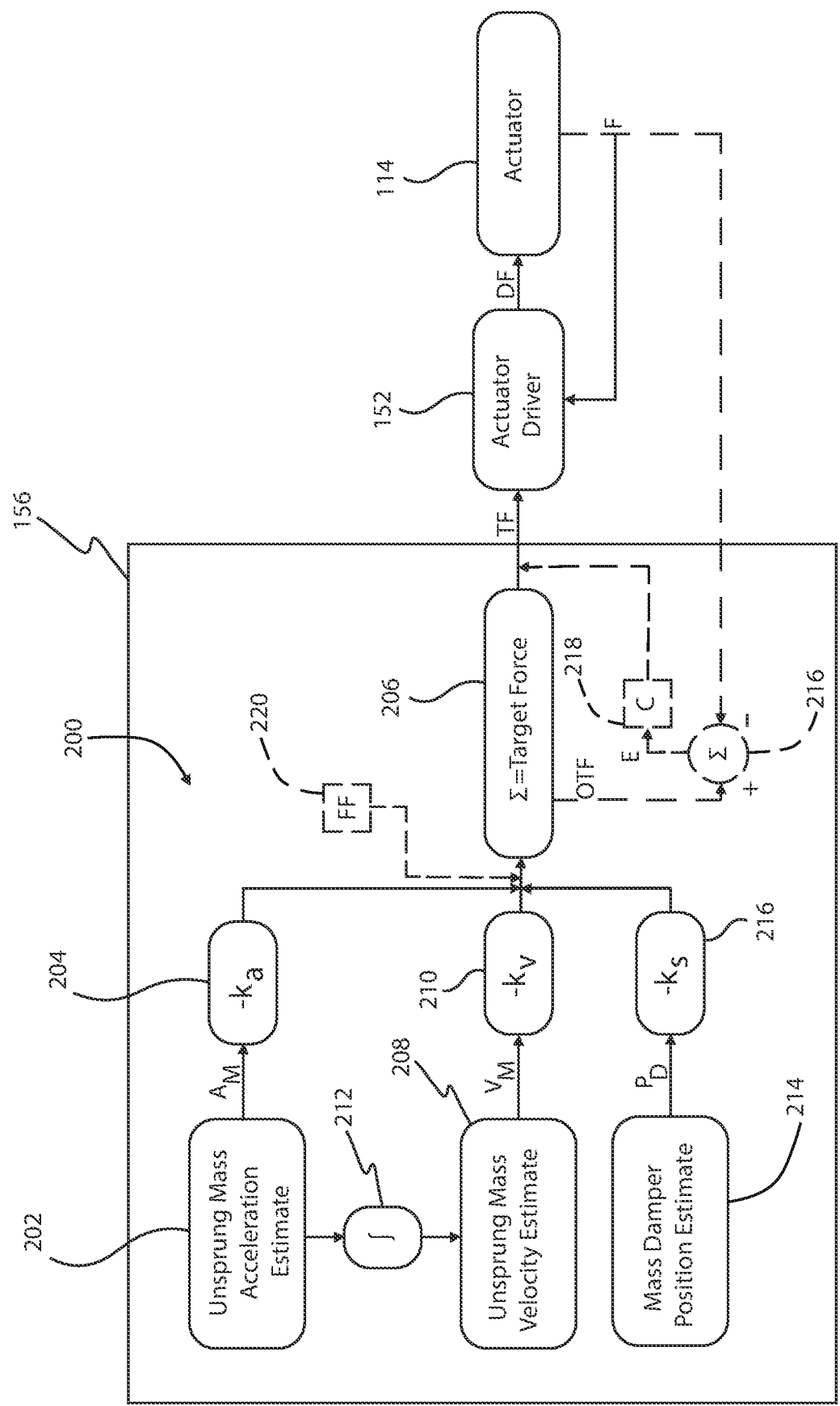
FIG. 6 is a simplified diagram of a portion of the control system depicted in FIG. 3 illustrating an embodiment of a control strategy implemented by the controller to control operation of the actuator.

Referring now to FIG. 6, a portion of the control system 150 depicted in FIG. 3 is shown illustrating an embodiment of a control strategy 200 implemented by the controller 156. In the illustrated embodiment, the control strategy 200 is stored in the memory 155 in the form of instructions executable by the controller 156 to control the actuator driver 152 to operatively drive the actuator 114 in a manner which displaces the active damper mass 112 along the rod or shaft 116 so as to effectively cancel, or at least reduce, movement of at least a portion of the sprung mass 12 along the z-axis induced by the movement $z_2$ of the unsprung mass 14 as described above. The controller 156 is illustratively operable to execute the control strategy 200 many times per second so as to instantaneously determine control variables and instantaneously control operation of the actuator 114, i.e., at least as fast as the transient movement induced on the unsprung mass 114 by the wheel and tire combination(s) 22,24. In the illustrated embodiment, the control strategy 200 includes a determination 202 by the controller 156 of the acceleration, $A_M$, of the unsprung mass 14. In the embodiment of the control system 150 illustrated in FIG. 3, the system 150 illustratively includes an acceleration sensor 162, e.g., an accelerometer, and in such embodiments the controller 156 is operable at 202 to determine the acceleration, $A_M$, of the unsprung mass 14 by estimating, i.e., computing, the unsprung mass acceleration based on the acceleration signal produced by the acceleration sensor 162. In alternate embodiments, the acceleration of the unsprung mass 14 may be alternatively or additionally determined or estimated via one or more other sensors as described above with respect to FIG. 3. In any case, the control strategy 200 further includes a multiplication block 204 which multiplies the unsprung mass acceleration, $A_M$, by a gain factor $-k_a$. In some embodiments, the gain factor $-k_a$ is a constant, although in other embodiments the gain factor $-k_a$ may be or include one or more linear, piecewise linear and/or non-linear functions. The compensated unsprung mass acceleration, $-k_a A_M$ is provided as an input to a summation block 206.

The illustrated control strategy 200 further includes a determination 208 by the controller 156 of the velocity, $V_M$, of the unsprung mass 14. In the embodiment of the control strategy 200 illustrated in FIG. 6, the control strategy 200 illustratively includes an integration block 212 which integrates the unsprung mass acceleration variable $A_M$, the acceleration signal produced by the acceleration sensor 162, to estimate, e.g., compute, the corresponding instantaneous velocity, $V_M$, of the unsprung mass 14. In alternate embodiments, the velocity of the unsprung mass 14 may be alternatively or additionally determined or estimated via one or more other sensors as described above with respect to FIG. 3. In any case, the control strategy 200 further includes a multiplication block 210 which multiplies the unsprung mass velocity, $V_M$, by a gain factor $-k_v$. In some embodiments, the gain factor $-k_v$ is a constant, although in other embodiments the gain factor $-k_v$ may be or include one or more linear, piecewise linear and/or non-linear functions. The compensated unsprung mass velocity, $-k_v A_M$ is provided as another input to the summation block 206.

The illustrated control strategy 200 further includes a determination 214 by the controller 156 of the position, $P_D$, of the mass 112 of the active damper 110. In the embodiment of the control system 150 illustrated in FIG. 3, the system 150 illustratively includes a position sensor 160, and in such embodiments the controller 156 is operable at 214 to determine the instantaneous position, $P_D$, of the active damper mass 112 along the rod or shaft 116, i.e., along the movement axis of the mass 112, by estimating, i.e., computing, the active damper mass position based on the position signal produced by the position sensor 160. In alternate embodiments, the position of the mass 112 of the active damper 110 may be alternatively or additionally determined or estimated via one or more other sensors as described above with respect to FIG. 3. In some embodiments in which the movement axis of the mass 112 is not parallel with the z-axis, the control strategy may include a determination by the controller 156 of the movement component of the damper mass 112 relative to the unsprung mass 14 acting along the z-axis. In other such embodiments, the control strategy may include a conversion factor, e.g., a multiplication factor or other factor(s), for computing displacement of the mass 112 so as to control movement of the mass 112 to counteract displacement of the unsprung mass 14. In other embodiments in which the movement axis of the mass 112 is parallel with the z-axis, the control strategy includes a determination by the controller 156 of movement or displacement of the damper mass 112 relative to the unsprung mass directly from the signal produced by the sensor 160. In any case, the control strategy 200 further includes a multiplication block 216 which multiplies the active damper mass position, $P_D$, by a gain factor $-k_s$. In some embodiments, the gain factor $-k_s$ is a constant, although in other embodiments the gain factor $-k_s$ may be or include one or more linear, piecewise linear and/or non-linear functions. The compensated active damper mass position, $-k_s P_D$ is provided as another input to the summation block 206.

In the illustrated control strategy 200, the summation block 206 produces a target force signal, TF, according to the relationship $TF = -k_a A_M - k_v V_M - k_s P_D$, which is provided as a control signal to the actuator driver 152. In some embodiments, as described above, the target force signal, TF, is a variable voltage signal, although in alternate embodiments the target force signal, TF, may be or include a variable current signal. In some alternate embodiments, the control strategy 200 may include one or more feedforward blocks 220, as illustrated in dashed-line representation in FIG. 6, so as to include one or more feedforward components in or as part of the target force signal, TF. Although only a single feedforward block 220 is illustrated in phantom in FIG. 6, it will be understood that the control strategy may include any number of feedforward blocks designed and arranged to include one or more feedforward components in or as part of the unsprung mass acceleration estimate, $A_M$, the compensated unsprung mass acceleration estimate $-k_a A_M$, the unsprung mass velocity estimate, $V_M$, the compensated unsprung mass velocity estimate, $-k_vV_M$, the active damper mass position estimate, $P_D$, the compensated active damper mass position estimate, $-k_sP_D$ and/or the target force signal TF.

In some embodiments, the actuator driver 152 is illustratively provided in the form of a conventional servo driver which includes a conventional controller for processing the feedback signal produced by the actuator 114 as briefly described above. The feedback signal, F, illustratively corresponds to a magnitude, amount or other measurable indicator of actuation, e.g., force, being applied by the actuator 114 to cause movement of the mass 112, e.g., voltage, current, force, torque, etc. In one example of this embodiment, the feedback signal, F, is a variable current signal, although in alternate embodiments the feedback signal, F, may be or include a variable voltage signal. In any case, the actuator driver 152, in embodiments in which it is provided in the form of a conventional servo driver, includes a conventional controller for producing a drive force signal, DF, as a function of the target force signal, TF, produced by the controller 156 and the feedback signal, F. In some embodiments, the controller included in the servo driver includes a conventional error-processing control strategy, such as a proportional-integral (PI), proportional-integral-derivative (PID) or other conventional control strategy, configured to produce the drive force signal, DF, based on an error or difference between the target force signal, TF, and the feedback signal, F. In alternate embodiments, the controller included in the servo driver may include a more sophisticated, conventional control strategy or a custom control strategy.

In some embodiments, the actuator 114 is programmed, e.g., via instructions stored in the memory 155 and executed by the controller 156, to center the active damper mass 112 relative to the rod or shaft 116 during non-damping conditions. Such centering of the mass 112 may illustratively correct for any errors in the load(s) of the spring(s) 122, 124 relative to the static load of the mass 112 (see FIG. 4). The control strategy 200 described above illustratively controls the actuator to move the mass 112 along the rod or shaft 116 to add kinetic energy to the system 100 or remove kinetic energy from the system depending upon the direction of travel of the mass 112 to provide for damping of movement of the unsprung mass 14 as described above. In some embodiments, the control strategy 200 may further include a spring rate travel limiting feature to prevent the mass 112 from reaching a respective end of travel so as to prevent any corresponding noise.

In some alternate embodiments, the actuator driver 152 may be configured only to produce the drive force signal, DF, to drive the actuator 114 based solely on the target force signal, TF, i.e., the actuator driver 152 in such embodiments does not include a controller for producing the drive force signal, DF, as a function of the feedback signal, F, and the feedback signal, F, therefore is not supplied to the actuator driver 152. In some such embodiments, the control strategy 200 stored in the memory 155 may include conventional or custom control components for providing a feedback-compensated target force signal, TF, to the actuator driver 152. An example of such control components is shown in dashed-line representation in FIG. 6, and include a summing node 216 which receives at an additive input an open loop target force signal, OTF, e.g., according to the relationship TF=-$k_aA_M$-$k_vV_M$-$k_sP_D$, and which receives at a subtractive input the feedback signal, F. The output of the summing node 216 is an error value, E, which represents a difference between TF and F, and is applied as an input to a control block 218.

The control block 218 illustratively includes a conventional error-processing control strategy, such as a proportional-integral (PI), proportional-integral-derivative (PID) or other conventional control strategy, configured to produce the target force signal, TF, based on an error or difference between the open-loop target force signal, OTF, and the feedback signal, F. In alternate embodiments, the control block 218 may include a more sophisticated, conventional control strategy or a custom control strategy. In any case, the feedback-compensated target force signal, TF, in this alternate embodiment, is provided to the actuator driver 152 which produces the drive force signal, DF, based solely on TF.

Figure 7:
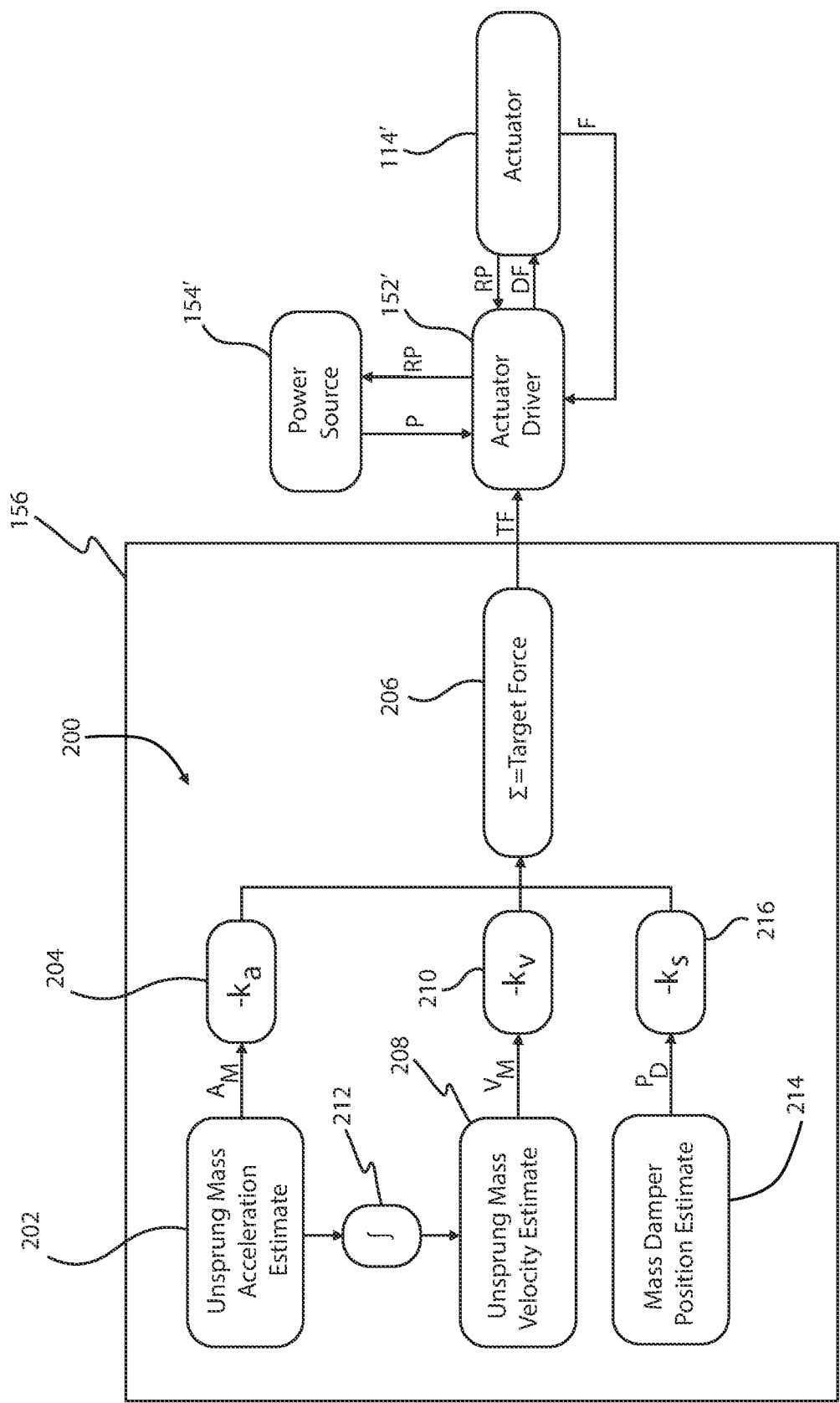
FIG. 7 is a simplified diagram similar to FIG. 6 illustrating modified components for recovering electrical power from the actuator during certain operations thereof.

Referring now to FIG. 7, an alternate embodiment is shown of the portion of the control system 150 depicted in FIG. 6. In the embodiment illustrated in FIG. 7, the control strategy 200 is unchanged from that described with respect to FIG. 6, and although the alternate control blocks 216, 218, 220 are not shown in FIG. 7 it will be understood that alternate embodiments of the control strategy 200 consistent with those illustrated in FIG. 6 and described above are intended to fall within the scope of this disclosure. The embodiment illustrated in FIG. 7 differs from that illustrated in FIG. 6 in that the actuator driver 152', power source 154' and actuator 114' are all modified to recover electrical power during certain operations of the system 150. In the illustrated embodiment, the power source 154' is rechargeable or otherwise configured to store electrical energy supplied thereto by the actuator driver 152'. In one example embodiment, the power source 154' includes one or more rechargeable batteries. In any case, the power source 154' is configured to supply electrical power, P, to the actuator driver 152' for operation thereof as described above, and the actuator driver 152' is configured to selectively supply electrical power to the actuator 114' in the form of the drive force signal, DF, as also described above. When the drive force signal, DF, is in the same direction as the movement of the actuator 114' (i.e., when the drive force signal, DF, corresponds to the same direction that the mass 112 is to be moved by the actuator 114'), electrical power, P, from the power source 154' is consumed by the actuator 114. However, in the illustrated embodiment the actuator 114' and the actuator driver 152' are both configured such that when the drive force signal, DF, is in a direction opposite to the movement of the actuator 114' (i.e., when the force of the actuator 114' acting on the mass 112 is opposing the velocity of the mass 112), kinetic energy of the unsprung mass 14 is converted by the actuator 114 to electrical energy and the actuator 114, in this embodiment, routes the resulting electrical power, or "recovered power" (RP), to the actuator driver 152' which, in turn, routes RP to the power source 154' to be recovered thereby, e.g., to recharge one or more rechargeable batteries included in the power source 154'. Absent this feature, such electrical energy converted by the actuator 114 from the kinetic energy of the unsprung mass 14 will typically be shunted, e.g., via a shunt resistor, as is the case in the system illustrated in FIG. 6.

Figure 8:
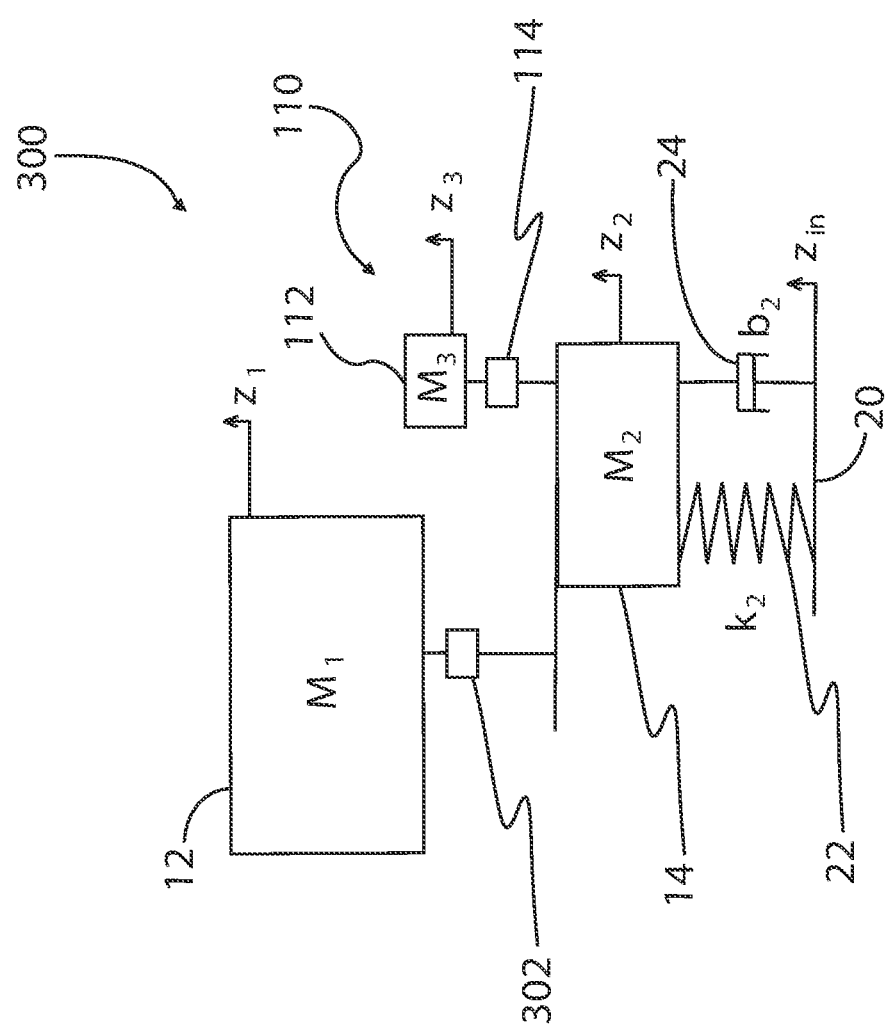
FIG. 8 is a simplified diagram of another embodiment of an active suspension system for a motor vehicle.

Referring now to FIG. 8, a simplified diagram is shown of another embodiment of an active suspension system 300 for a motor vehicle. The active suspension system 300 is identical in many respects to the active suspension system 100 illustrated in FIG. 3 and described above, and like numbers are therefore used to identify like components, it being understood that such components are in structure and operation as described above. The active suspension system 300 differs from the active suspension 100 in that the ride spring 16 is replaced with a conventional air spring damper 302 for damping movement of the sprung mass 12. In one embodiment, the air spring damper 302 is provided in the form of a conventional 2-chamber air spring damper for damping movement of the sprung mass 12, i.e., such that the air spring damper 302 replaces the ride spring 16 depicted in FIG. 1, and in such embodiments the system 300 further includes the active mass damper 110, as illustrated by example in FIG. 8, for damping movement of the unsprung mass 14 as described above, i.e., such that the active mass damper 110 replaces the passive damper 18 depicted in FIG. 1 as described above. In another embodiment, the air spring damper 302 is provided in the form of a conventional 3-chamber air spring damper for damping movement of both the sprung mass 12 and the unsprung mass 14. In some such embodiments, the active mass damper 110 may be omitted and the air spring damper 302 may be tuned for control of the sprung mass 12 and control of the unsprung mass 14, i.e., such that the air spring damper 302 replaces both of the ride spring 16 and the passive damper 18 depicted in FIG. 1. In other such embodiments, the active mass damper 110 may be included in the system 300 for controlling damping of the unsprung mass 14 (such that the active mass damper 110 replaces the passive damper 18 depicted in FIG. 1), and the 3-chamber air spring damper 302 may be tuned for controlling damping of the sprung mass 12 (such that the air spring damper 302 replaces the ride spring 16 depicted in FIG. 1).

Figure 9B:
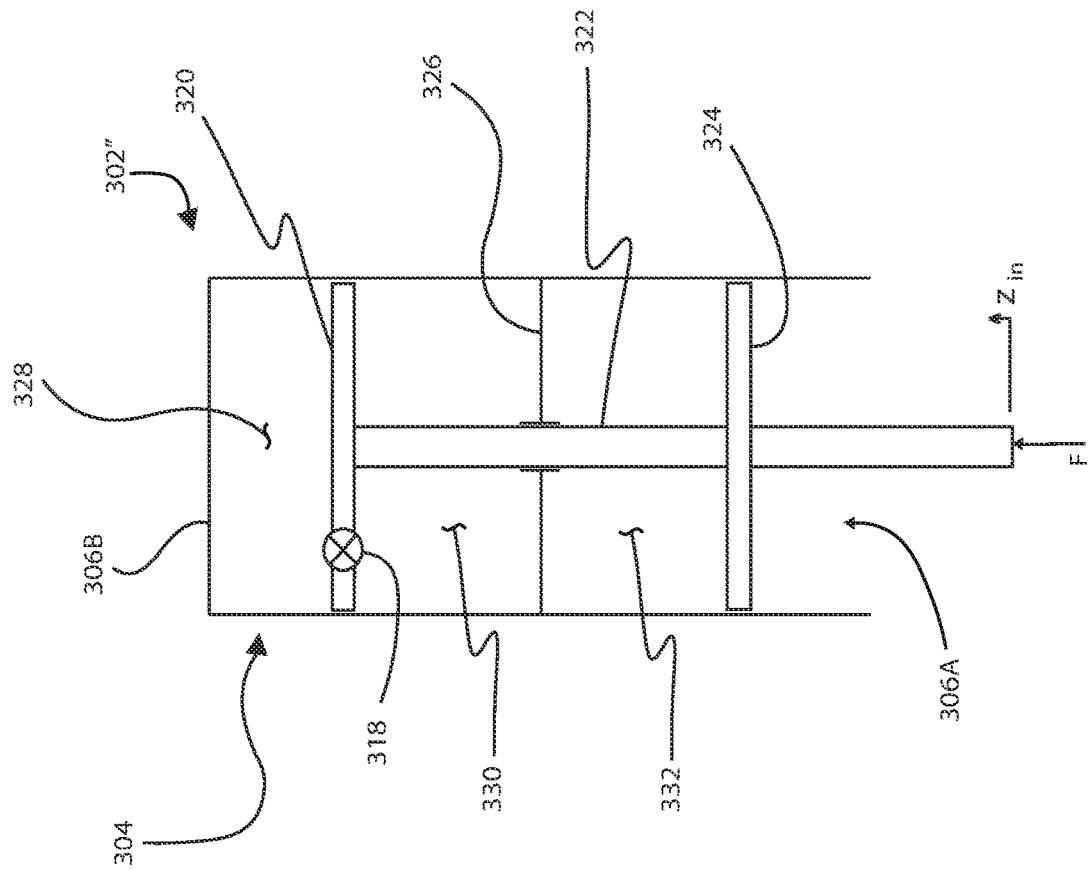
FIG. 9B is a simplified diagram of another embodiment of the spring damper illustrated in FIG. 8.
Figure 9A:
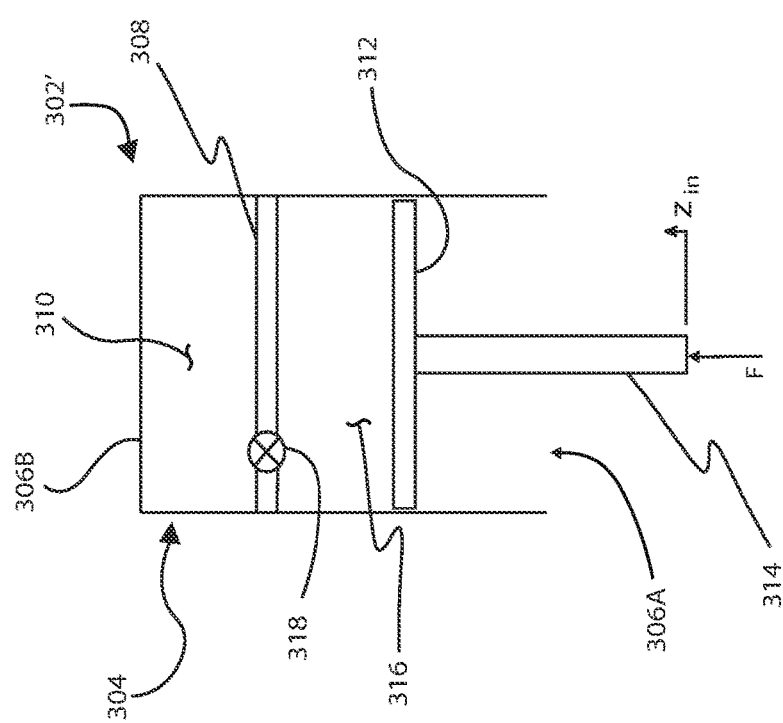
FIG. 9A is a simplified diagram of an embodiment of the spring damper illustrated in FIG. 8.

Referring now to FIG. 9A, an embodiment is shown of a 2-chamber air spring damper 302' which may be used as the air spring damper 302 in the system 300 illustrated in FIG. 8. In the illustrated embodiment, the air spring damper 302' includes an elongated housing 304 defining an open end 306A and an opposite closed end 306B, a transverse, fixed wall 308 spaced apart from the closed end 306B to and extending across the housing 304 to form a first chamber 310 between the closed end 306B and the transverse wall 308. Another wall 312 likewise extends across the housing 304 and is spaced apart from the wall 308 to form a second chamber 316 between the walls 308, 312. One end of a plunger 314 is affixed to the wall 314, and an air valve 318 is operatively coupled to the wall 308 for setting the respective air pressures within the chambers 310, 316. An opposite end of the plunger 314 is illustratively attached to the unsprung mass 14 and the closed end 306B of the housing is attached to the sprung mass 12 or vice versa. Movement of the sprung mass 12 induced by movement of the unsprung mass 14 is damped by the damped movement of the plunger 312 and the transverse wall 312 relative to the chambers 310, 316, the fixed wall 308 and the air pressures set within the chambers 310, 316.

Referring now to FIG. 9B, an embodiment is shown of a 3-chamber air spring damper 302" which may be used as the air spring damper 302 in the system 300 illustrated in FIG. 8. In the illustrated embodiment, the air spring damper 302" includes another elongated housing 304 defining an open end 306A and an opposite closed end 306B, a transverse, fixed wall 326 spaced apart from the closed end 306B and extending across the housing 304. One end of a plunger 322 extends centrally through the wall 326 and is attached to a movable, transverse wall 320 positioned between the fixed wall 326 and the closed end 306B of the housing 304, and another movable, transverse wall 324 positioned between the fixed wall 326 and the open end 306A of the housing 304 is also attached to the plunger 322. A first chamber 328 is defined between the closed end 306B of the housing 304 and the movable wall 320, a second chamber 330 is defined between the movable wall 320 and the fixed wall 326 and a third chamber 332 is defined between the fixed wall 326 and the movable wall 324. An air valve 318 is operatively coupled to the wall 320 for setting the respective air pressures within the chambers 328, 330, 332. The opposite end of the plunger 322 is illustratively attached to the unsprung mass 14 and the closed end 306B of the housing is attached to the sprung mass 12 or vice versa. In the system 300 illustrated in FIG. 8, movement of the sprung mass 12 induced by movement of the unsprung mass 14 is damped by the damped movement of the plunger 322 and the transverse walls 320, 324 relative to the chambers 328, 330, 332, the fixed wall 326 and the air pressures set within the chambers 328, 330, 332.

It will be understood that whereas the air spring damper 302' and the 3-chamber air spring damper 302" are illustrated in FIGS. 9A and 9B and described above as taking the form of rods and plungers translatable within and relative to defined chambers, such embodiments are shown and described only by way of example and should not be considered limiting in any way. In some alternate embodiments, for example, either or both air spring dampers 302', 302" may take the form of a conventional elastomeric air spring such as, but not limited to, a conventional rolling lobe air spring. Alternatively or additionally, the air spring damper 302' and/or the air spring damper 302" may take the form of a conventional bellows air spring.

Figure 10A:
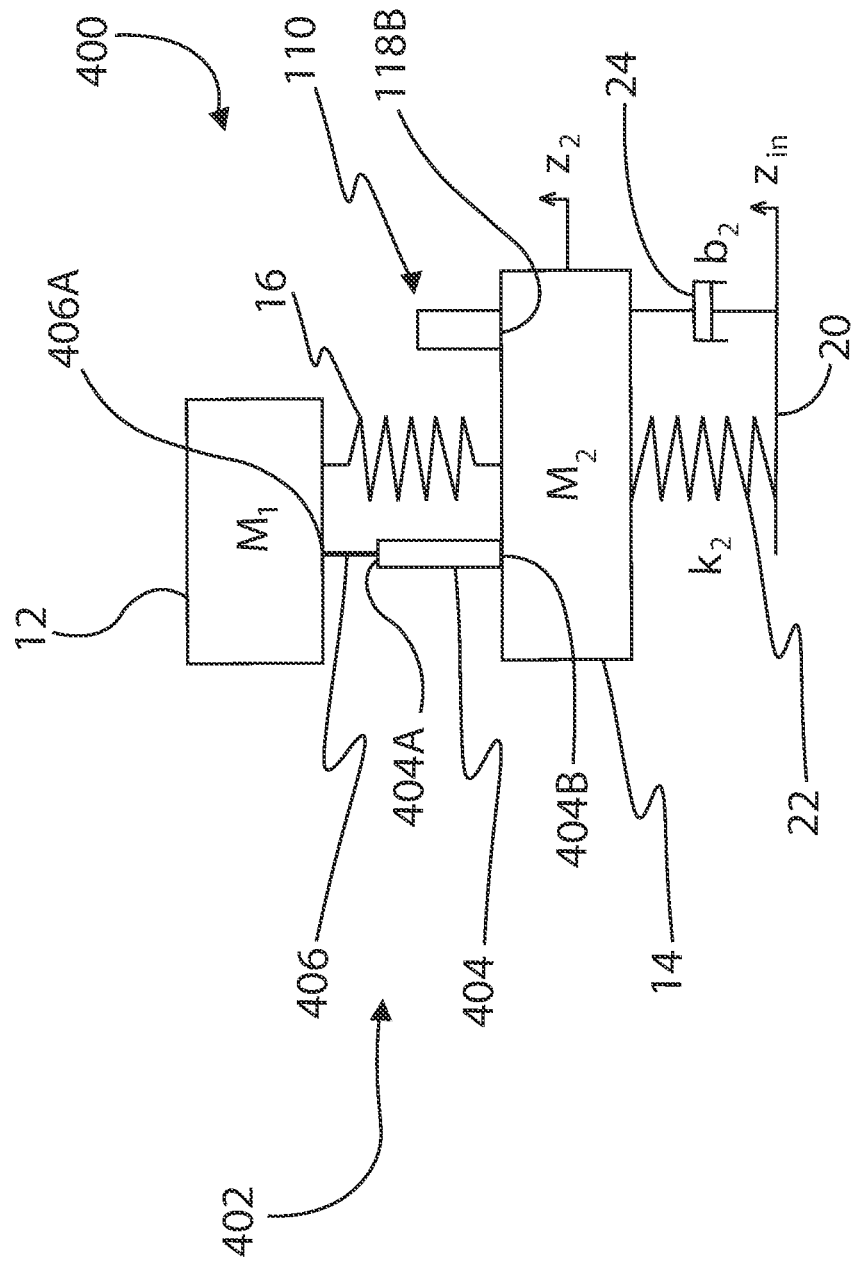
FIG. 10A is a simplified diagram of still another embodiment of an active suspension system for a motor vehicle.

Referring now to FIG. 10A, a simplified diagram is shown of another embodiment of an active suspension system 400 for a motor vehicle. The active suspension system 400 is identical in many respects to the active suspension systems 100 and 300 illustrated in FIGS. 2 and 8 respectively and described above, and like numbers are therefore used to identify like components, it being understood that such components are, in structure and operation, as described above. The active suspension 400 differs from the active suspension systems 100 and 300 in that an electrically-controlled force actuator 402 is mounted to and between the sprung mass 12 and the unsprung mass 14 in parallel with the spring 16, in the case of the active suspension system 100 illustrated in FIG. 2, or in parallel with the air spring damper 302 in the case of the active suspension system 300 illustrated in FIG. 8, wherein the electrically-controlled force actuator 402 is operable to damp movement of the sprung mass 12 relative to the unsprung mass 14. In one embodiment, the electrically-controlled force actuator 402 is provided in the form of an electromagnetic actuator such as a voice coil actuator (VCA) mounted to and between the sprung mass 12 and the unsprung mass 14, although in some alternate embodiments one or more other conventional, electrically-controlled force actuators may be used. In the active suspension system 400 illustrated in FIG. 10A, the active mass damper 110 is mounted only to the unsprung mass 14 and is controlled and operable as described above for controlling damping of the unsprung mass 14, and the electrically-controlled force actuator 402 may be controlled, e.g., as described below, for controlling damping of the sprung mass 12 relative to the unsprung mass 14, such that the active mass damper 110 and the force actuator 402 are together configured, controlled and operable to damp movement of the unsprung mass 14 and movement of the sprung mass 12 respectively.

In the illustrated embodiment, the force actuator 402 includes a housing 404 having a top end 404A and a bottom end 404B, wherein the bottom end 404B of the housing 404 is attached to the unsprung mass 14. A portion of a rod or shaft 406 extends downwardly into the housing, and another portion extends upwardly from and away from the top end 404A of the housing 404. A top end 406A of the rod or shaft 406 is attached to the sprung mass 12. Alternatively, the bottom end 404B of the housing 404 may be attached to the sprung mass 12, and the top end 406A of the rod 406 may be attached to the unsprung mass 14. In any case, an electrically-controllable body is affixed to rod or shaft 406 at or adjacent to the bottom end of the rod or shaft 406, and the force actuator is electrically controllable to move the body within the housing 404 along the z-axis so as to deliver a force between the sprung and unsprung masses 12, 14 which damps movement of the sprung mass 12 along the z-axis relative to the unsprung mass 14 as will be described in detail below.

Figure 10B:
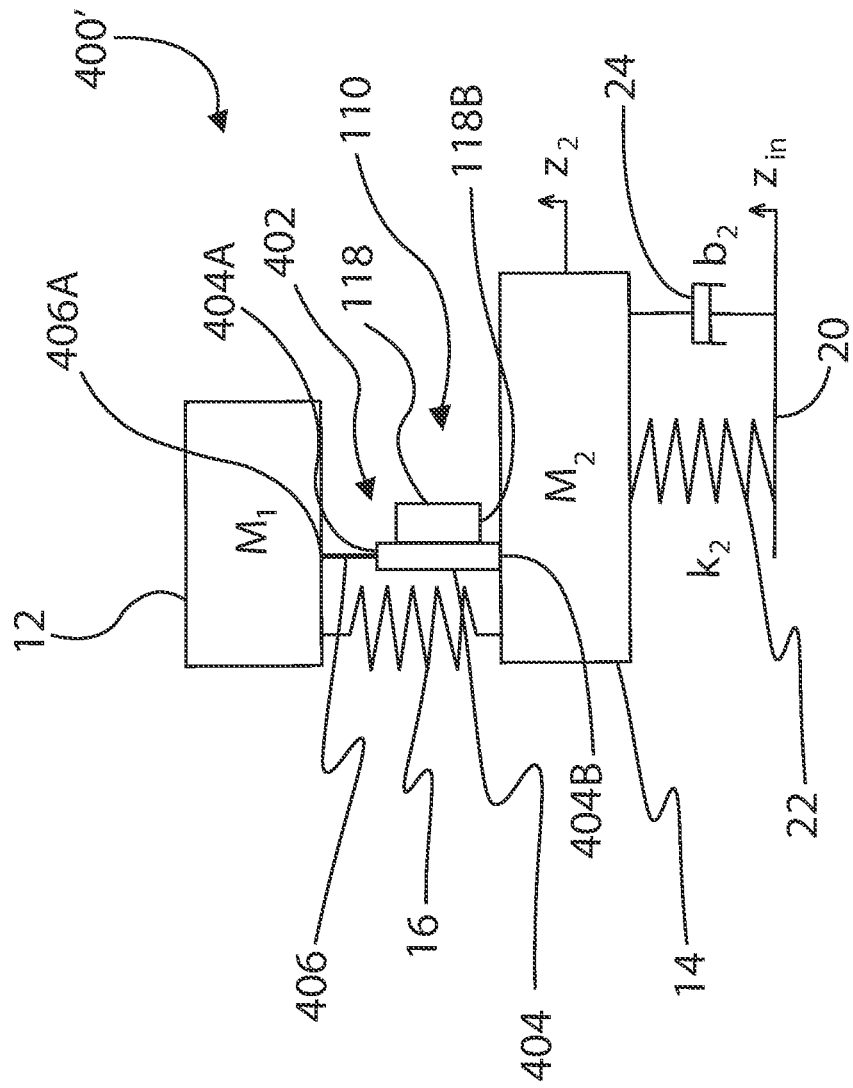
FIG. 10B is a simplified diagram similar to FIG. 10A and illustrating yet another embodiment of an active suspension system for a motor vehicle.

Referring now to FIG. 10B, a simplified diagram is shown of yet another embodiment of an active suspension system 400' for a motor vehicle. The active suspension system 400' is identical in many respects to the active suspension system 400 illustrated in FIG. 10A and described above, and like numbers are therefore used to identify like components, it being understood that such components are, in structure and operation, as described above. The active suspension 400' differs from the active suspension system 400 in that the housing 118 of the active mass damper 110 is attached directly to the housing 404 of the force actuator 404 such that the bottom 118B of the housing 118 need not be attached or otherwise mounted directly to the unsprung mass 14 as it is in the active suspension system 400 illustrated in FIG. 10A. In some alternate embodiments, the housings 118 and 404 may instead be integral with one another, i.e., of unitary construction. In any case, the active mass damper 110 and the force actuator 404 are each operable as described herein.

The force actuator 402 illustratively provides an electrically-controllable force between the sprung mass 12 and the unsprung mass 14, wherein this force is measured and determined by a controller and/or wherein one or more movement parameters of the sprung mass 12 and, in some embodiments, of one or more other suspension components, is/are measured and the force is estimated by the controller based on the measured one or more movement parameters. In some embodiments, the force actuator 402 may be controlled by the controller to control the movement of the sprung mass 12 with a damping force which emulates or otherwise replaces the shock absorber(s) 18 shown in FIG. 1 and described above. In some embodiments, the force actuator 402 may be controlled by the controller to control movement of the sprung mass 12 with a damping force acting in a direction opposite to the absolute velocity of the sprung mass 12, i.e., so-called "sky-hook" damping. In some embodiments, the force actuator 402 may be controlled by the controller to assist the active mass damper 110 in the damping of the unsprung mass 14, particularly in the case of large displacements of the unsprung mass 14 which may be too large to be adequately damped by the active mass damper 110 alone. In such embodiments, the force actuator 402 may be controlled so as to respond only to such large amplitudes of displacement of the unsprung mass 14, and to not respond to smaller amplitudes of displacement of the unsprung mass 14 which can be adequately controlled by the active mass damper 110. In some embodiments, the force actuator 402 may be controlled so as to control the force in the suspension during extreme compression or rebound movement of the suspension so as to manage kinetic energy and prevent very large loads from being exerted into the body of the motor vehicle or the suspension near the limits of suspension travel.

Even with the active mass damper 110 controlled as described above in the systems 100 and 300, there may still be so-called secondary ride forces contributed by one or more suspension components, e.g., one or more ride springs 16 (each of which may include one or more of coil spring(s), air spring(s), leaf spring(s), torsion bar(s) etc.), one or more stabilizer bars and/or one or more control arm bushings. Although such secondary ride forces may be relatively small compared to the contribution of one or more shock absorbers in conventional suspension systems, such secondary ride forces may be significant. In this regard, the force actuator 402 may be controlled by the controller in some embodiments, as briefly described above and as further described below, to deliver forces opposite to and of an identical or similar magnitude to a sum of the secondary ride forces contributed by the one or more suspension components described above, thereby effectively offsetting and at least partially eliminating all such contributors to the secondary ride forces. In some such embodiments, the force actuator 402 may be controlled by the controller to perform only at high frequencies, e.g., in the range of 5-20 Hz, of the secondary ride forces so as not to disturb the performance of the ride spring and stabilizer bar in primary ride motions and cornering, which are ride events normally occurring at frequencies below 5 Hz. In some such embodiments, the force actuator 402 may be controlled by the controller to perform only at and during small amplitudes of movement of the unsprung mass 14. In some such embodiments, conventional sensor information, such as, but not limited to, those indicating position of the sprung mass 12 relative to the unsprung mass 14, vehicle speed, steering wheel angle, lateral acceleration and/or fore/aft acceleration, may be used by the controller to differentiate, or to assist in differentiating, between primary ride events, e.g., handling events, and secondary ride events. In some such embodiments, the secondary ride force determinations or estimations may be filtered such that the controller responds only to small amplitude and/or high frequency secondary ride force events. In any case, the controller, in such applications, will generally control the force actuator(s) 402 in a manner which causes the force actuator(s) 402 to deliver a force(s) in a direction opposite to that/those of the secondary ride forces so as to counteract the loads of the various contributors to the secondary ride forces. In this regard, it bears pointing out that the force actuator 402 illustratively differs from the active mass damper 110 primarily in that whereas the active mass damper 110 displaces a mass 112 to counteract movement of the unsprung mass 14 as described in detail above, the force actuator 402 operates to deliver a force between the sprung mass 12 and the unsprung mass 14 in a manner which counteracts movement of the sprung mass 12 and/or of load(s) produced by secondary ride components, relative to the unsprung mass 14.

Figure 11:
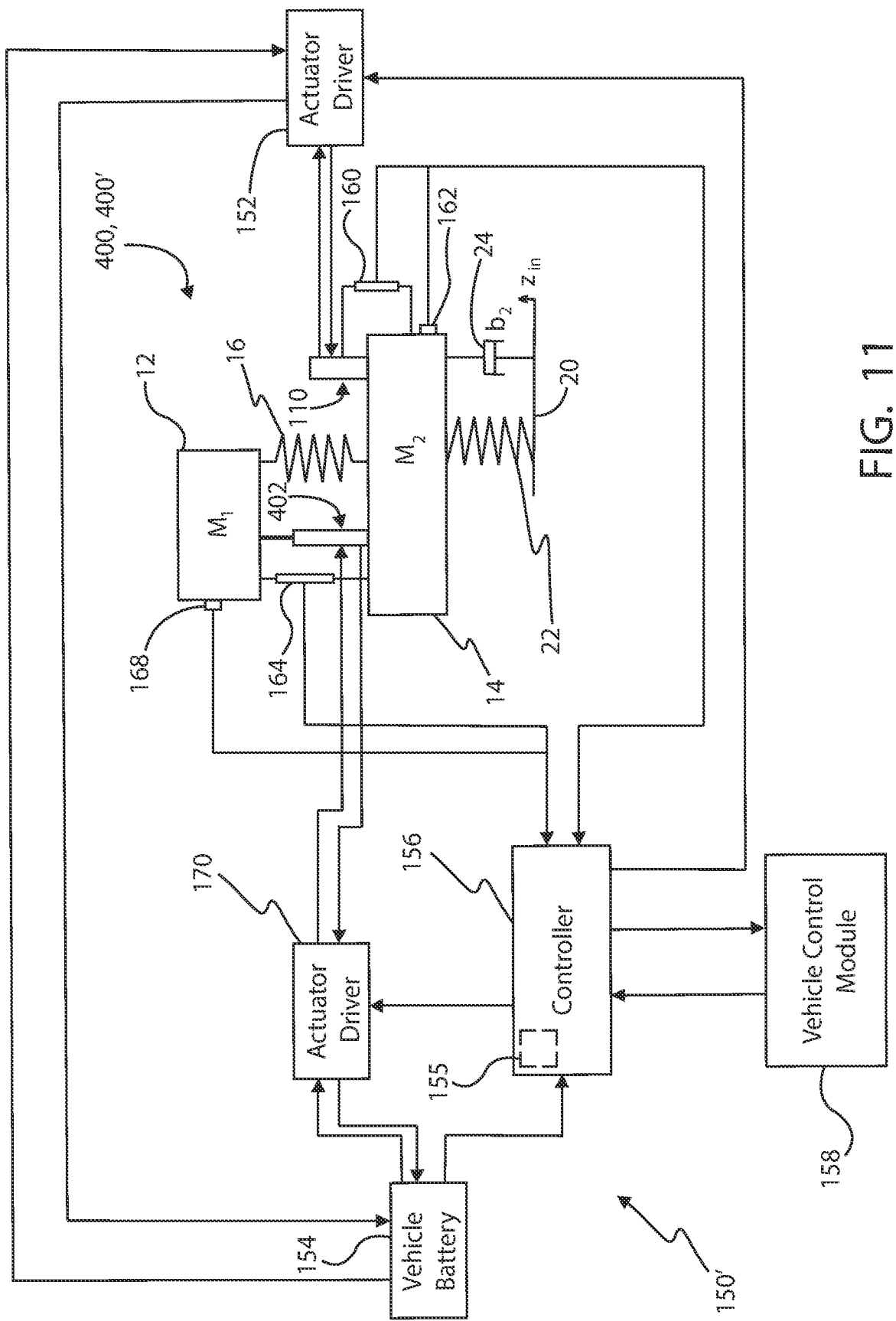
FIG. 11 is a simplified diagram of an embodiment of a control system operatively coupled to, and configured to control, an active suspension system of the type depicted in FIG. 10A and/or FIG. 10B.

Referring now to FIG. 11, an embodiment is shown of a control system 150' operatively coupled to the active suspension system 400 of FIG. 10A or to the active suspension system 400' of FIG. 10B. The control system 150' is illustratively identical in many respects to the control system 150 illustrated in FIG. 3 and described above, is illustratively configured to control operation of the active mass damper 110 in a manner which effectively cancels, or at least reduces, movement of the unsprung mass 14 in response to road terrain-induced movement z0 acting on the unsprung mass 14 via the wheel and tire combination(s) 22, 24 as described above, and to control operation of the force actuator 402 in a manner which effective cancels, or at least reduces, movement of the sprung mass 12 relative to the unsprung mass 14. In the illustrated embodiment, the control system 150' illustratively includes an actuator driver 170 having at least one signal output connected to the force actuator 402, wherein the actuator driver 170 is configured to produce at the signal output(s) at least one drive signal for driving the force actuator 402 to a target force value; i.e., to deliver a target force to and between the sprung and unsprung masses 12, 14. In some embodiments, such as that illustrated in FIG. 11, at least one signal output of the force actuator 402 is connected to the actuator driver 170, and in such embodiments the force actuator 402 is configured to supply the actuator driver 170 with a feedback signal, e.g., voltage, current, etc., corresponding to a magnitude, amount or other measurable indicator of force being applied by the force actuator 140 to the body carried by and within the housing 404, in response to the at least one drive signal. In one example of this embodiment, the actuator driver 170 is illustratively identical to the actuator driver 152 illustrated in FIGS. 3 and 11 or any variant thereof as described above, although in some alternate embodiments the actuator driver 170 may be provided in one or more other conventional forms. In some alternate embodiments, the actuator drivers 152, 170 may be combined into a single driver including two (or more) driver circuits each configured to drive a different one of the actuators 110, 402.

In the embodiment illustrated in FIG. 11, the electrical power source 154 depicted in FIG. 3 also provides electrical power to the actuator driver 170 via at least one signal path. In some embodiments, another electrical signal path may be connected between the actuator driver 170 and the electrical power source 154, as illustrated by example in FIG. 11, for the purpose of recovering electrical energy by the electrical power source 154, e.g., for the purpose of recharging the electrical power source 154, during certain operating conditions of the control system 150 as described above with respect to FIG. 7. In alternate embodiments, two or more separate power sources may be used to drive the actuators 152, 170, e.g., with at least one of the two or more separate power sources connected to drive the actuator 152 and configured to drive the actuator 152, and with at least another of the two or more separate power sources connected to the actuator 170 and configure to drive the actuator 170.

In the embodiment illustrated in FIG. 11, the controller 156 depicted in FIG. 3 is also electrically connected to the actuator driver 170, and is configured to control operation of both of the actuator driver 152 and the actuator driver 170. In this embodiment, the one or more memory devices 155 has/have instructions stored therein executable by the controller 156 to cause the controller 156 to produce at least one control signal to control operation of the actuator driver 152 as described above with respect to FIG. 6 or with respect to FIG. 7, and further has separate instructions stored therein executable by the controller 156 to cause the controller 156 to produce at least one control signal to control operation of the actuator driver 170 as will be described in greater detail below with respect to FIG. 13. In some alternate embodiments, the control system 150' may include separate control circuits; at least one control circuit for controlling the actuator driver 152, and at least another control circuit for controlling the actuator driver 170, wherein each of the separate control circuits is electrically connected to the electrical power source 154 (or each to separate electrical power sources) and wherein each of the separate control circuits is electrically connected, or otherwise operatively coupled to, the control module 158. In some such alternate embodiments which include at least two control circuits, each of the separate control circuits include one or more memory devices, wherein one of the one or more memory devices has/have instructions stored therein executable by at least one of the control circuits to cause the at least one of the control circuits to produce at least one control signal to control operation of the actuator driver 152, and wherein another of the one or more memory devices has/have instructions stored therein executable by at least another of the control circuits to cause the at least another of the control circuits to produce at least one control signal to control operation of the actuator driver 170.

The control system 150' further illustratively includes at least one sensor configured to produce at least one sensor signal indicative of relative movement between the sprung and unsprung masses 12, 14, and the control circuit 156 is, in turn, configured, e.g., programmed, to produce at least one control signal, based on the at least one sensor signal, to control the actuator driver 170 to produce at least one drive signal to drive the force actuator 402. In the illustrated embodiment, the system 150' includes a position or displacement sensor 164 having a signal output electrically connected to a signal input of the controller 156. The position sensor 164 is illustratively configured to produce a position or displacement signal on the signal output thereof corresponding to relative position or displacement between the sprung and unsprung masses 12, 14, i.e., from which the distance along the z-axis between the sprung and unsprung masses 12, 14 can be determined. The position or displacement sensor 164 may be as described above with respect to the position sensor 160 or any variant thereof, non-limiting examples of which are also described above. In some alternate embodiments, the position or displacement sensor 164 may include two or more conventional position or displacement sensors each configured to produce a separate position or displacement signal, and the controller 156 may illustratively be configured in such embodiments compute the relative distance between the sprung and unsprung masses 12, 14 using a combination of such two or more position or displacement signals. In other alternate embodiments, the relative distance between the sprung and unsprung masses 12,14 may be estimated, e.g., according to one or more conventional models, based, at least in part, on information provided by one or more other types of sensors, examples of which may include, but are not limited to, inductance feedback from electrical coils of the force actuator 402, at least one strain gage mounted to or integral with the ride spring 16, at least one pressure sensor positioned between the body carried within the housing 404 of the force actuator 402 and the sprung mass 12, or the like.

The control system 150' further illustratively includes an acceleration sensor 168 mounted to the sprung mass 12 and having a signal output electrically connected to another signal input of the controller 156. The acceleration sensor 168 is illustratively configured to produce an acceleration signal on the signal output thereof corresponding to acceleration of the sprung mass 12 during movement of the sprung mass 12 along the z-axis. In one embodiment, the acceleration sensor 168 is a conventional accelerometer operatively mounted to the sprung mass 12. In some alternate embodiments, the acceleration sensor 168 may include two or more such accelerometers, and the controller 156 is illustratively operable to determine the acceleration of the sprung mass 12 as a function of signal(s) produced by one or any combination of such two or more accelerometers. In other alternate embodiments, the acceleration of the sprung mass 12 may be estimated, e.g., according to one or more conventional models, based, at least in part, on information provided by one or more other types of sensors, examples of which may include, but are not limited to, at least one position sensor, e.g., the position sensor 164, mounted between the sprung mass 12 and the unsprung mass 14 (wherein the controller 156 is operable to determine acceleration of the sprung mass 12 by twice differentiating the position sensor signal), a pressure sensor mounted to and between the ride spring 16 and the sprung mass 12 and/or a pressure sensor mounted to the ride spring 16 (wherein the controller 156 is operable to determine acceleration of the sprung mass 12 as a function of the dynamic pressure changes resulting from action of the ride spring 16), a strain gage mounted to the ride spring 16 (wherein the controller 156 is operable to determine acceleration of the sprung mass 12 as a function of the ride spring 16 acting on the strain gage), or the like.

Figure 12:
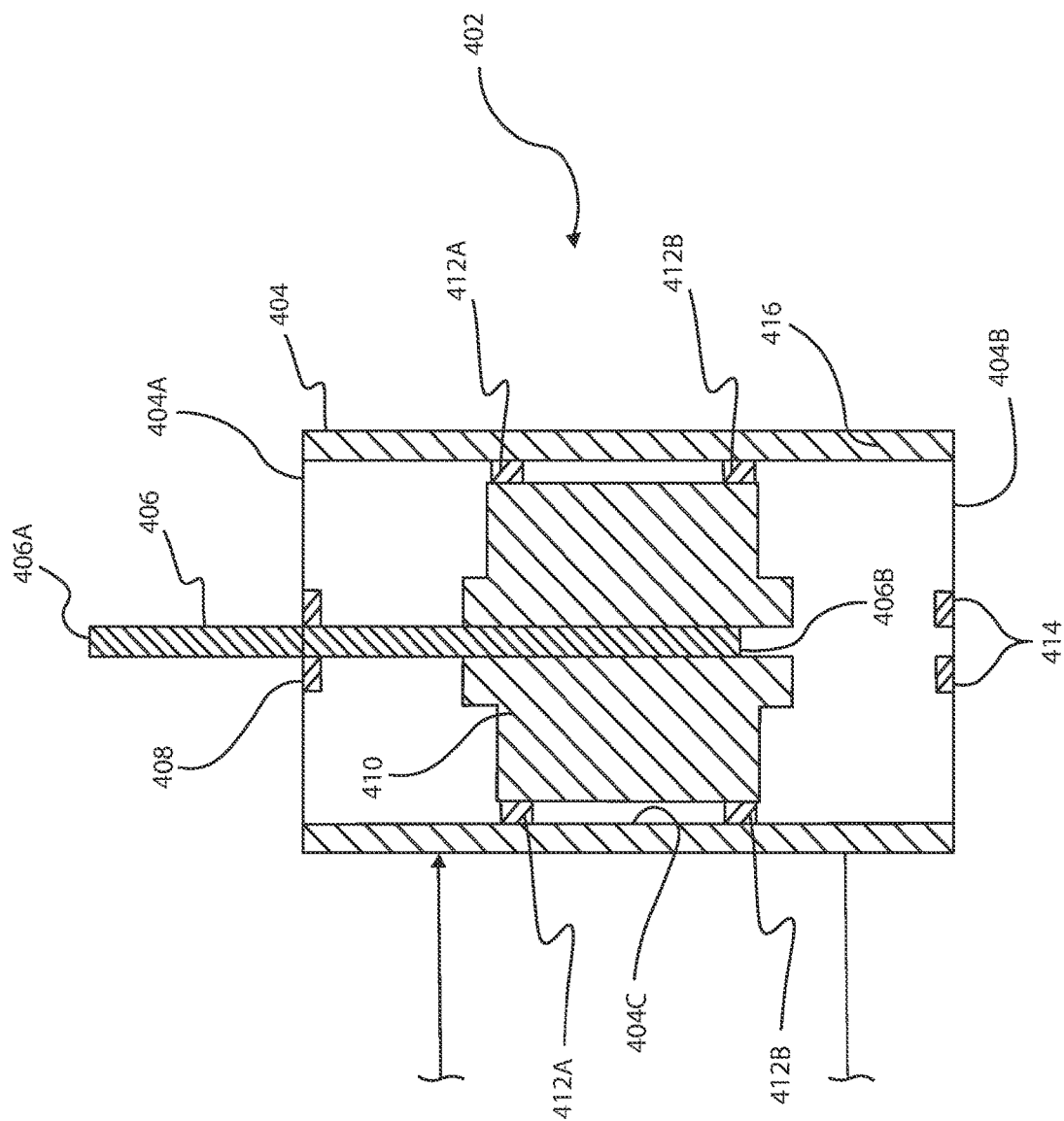
FIG. 12 is a simplified longitudinal cross-sectional view of an embodiment of the force damping actuator depicted in FIGS. 10A and 10B as being coupled to and between the sprung and unsprung masses, as viewed along a plane bisecting the actuator centrally through the z-axis.

Referring now to FIG. 12, a simplified longitudinal cross-sectional view is shown of an embodiment of the electrically-controlled force actuator 402 illustrated in FIG. 11. In the illustrated embodiment, the electrically-controlled force actuator 402 is provided in the form of an electromagnetic actuator such as a voice coil actuator (VCA) mounted to and between the sprung mass 12 and the unsprung mass 14, although in alternate embodiments one or more other conventional, electrically-controlled force actuators may be used. As described above with respect to FIG. 10A, the electrically-controlled force actuator 402 is mounted to and between the sprung mass 12 and the unsprung mass 14, and includes a housing 404 having a top end 404A and a bottom end 404B, wherein the bottom end 404B of the housing 404 is configured to be attached to the unsprung mass 14 either directly or via a control arm (or to the sprung mass 12). A bottom end 406B of a rod or shaft 406 extends downwardly through the top 404A of the housing and into the housing 404, and a top end 406A of the rod or shaft 406 extends upwardly out and away from the top end 404A of the housing 404, and is configured to be attached to the sprung mass 12 (or to the unsprung mass 14), all as illustrated by example in FIGS. 10A-11 and described above. A bearing and rebound bumper seal 408 is attached to the top end 404A of the housing, and the bearing/seal 408 defines an opening through which the rod or shaft 406 extends into the housing 404. A movable body 410 is affixed to the rod or shaft 406 at or adjacent to the bottom end 406B of the rod or shaft 406. Illustratively, the housing 404 and the body 410 are cylindrical bodies, with the rod or shaft extending centrally through and attached to the body 410, and bearings 412A and 412B are disposed about upper and lower portions the body 410 respectively, such that the bearings 412A, 412B are positioned between, and in contact with, the body 410 and inner surface 404C of the housing 404. Alternatively, the bottom end 406B of the rod or shaft may be affixed to a top end of the body 410 rather than pass through the body 410 as illustrated by example in FIG. 12. A compression bumper 414 is attached to inner surface of the bottom end 404B of the housing 404. The bearing and rebound bumper 408 and the compression bumper 414 are both axially aligned with the body 410.

In one embodiment, the body 410 is illustratively provided in the form of a magnet, e.g., a permanent magnet, and an electrical coil 416 is coupled to or integral with the housing 404 and at least partially surrounds the magnet 410. The electrical coil 416 is electrically connected to the actuator driver 170 of the control system 150' illustrated by example in FIG. 11. In the illustrated embodiment, the electrical coil 416 extends to and between the ends 404A, 404B of the housing 404 and/or extends completely about the periphery of the housing 404, although in some alternate embodiments the electrical coil 416 may stop short of the top and/or bottom end(s) 404A, 404B of the housing 404, and/or may extend only partially about the periphery of the housing 404. In any case, activation of the electrical coil 416, in response to a drive signal produced by the actuator driver 170, establishes a force between the magnet 410 and the housing 404 which causes the combination of the rod or shaft 406 and the magnet 410 to move axially along and relative to the housing 404. The magnitude of the drive signal produced by the actuator driver 170 will generally define the magnitude of the force applied between the sprung and unsprung masses 12, 14, and the polarity of the drive signal produced by the actuator driver 170 will generally defined the direction of the force applied between he sprung and unsprung masses 12, 14. The controller 156 illustratively controls application of such a drive signal to the actuator driver 170 to move the magnet 410 axially within the housing 404 along the z-axis so as to provide a damping force along the z-axis between the sprung and unsprung masses 12, 14 generally opposite to relative movement along the z-axis between the sprung and unsprung masses 12, 14, as will be described in detail below. The bearing and rebound bumper 408 and the compression bumper 414 operate as top and bottom contact bumpers with respect to the top and bottom ends respectively of the magnet 410.

The bottom end 404B of the housing 404 is mounted or otherwise operatively coupled to the unsprung mass 14 (or to the sprung mass 12), and the top end of the rod or shaft 406 is mounted or otherwise operatively coupled to the sprung mass 12 (or to the unsprung mass 14) as depicted by example in FIGS. 10A-11. The magnet 410, along with the rod or shaft 406, can be driven axially within and along the housing 404 by selectively activating the electrical coil 416. The electrical coil 416 is illustratively a current-driven coil wherein the linear force acting on the magnet 410 and the rod or shaft 406 is proportional to the magnitude of the drive current applied to the coil 416. In one embodiment, the magnet 410 and rod or shaft 406 can be driven downwardly into and along the inner surface 404C of the housing 404 by driving the electrical coil 416 with a negative current and can be driven upwardly and along the inner surface 404C of the housing 404 by driving the electrical coil 416 with a positive current, although in alternate embodiments the magnet 410 can be driven upwardly with a negative current and downwardly with a positive current. In any case, the switching speed of the electrical coil 416 is illustratively selected to be at least as fast as the fastest expected transient relative movement between the sprung and unsprung masses 12, 14 along the z-axis. It will be understood that whereas the force actuator 402 is depicted in FIG. 12 and described herein as a linear actuator, i.e., in which the magnet 410 moves linearly within and along the housing 404, this disclosure contemplates alternate embodiments in which the force actuator 402 is or includes a non-linear actuator, i.e., in which the magnet 410 moves non-linearly or piecewise linearly within and along the housing 404.

The force of the force actuator 402 is illustratively controlled so as to effectively cancel, or at least reduce, relative movement along the z-axis between the sprung and unsprung masses 12, 14 as described herein. In this regard, it will be understood that at least one dedicated force actuator 402 will typically be placed at or near each wheel of the motor vehicle so that the combined forces of the multiple force actuators 402 will be controlled to cancel or at least reduce relative vertical movement between the sprung and unsprung masses 12, 14 of the motor vehicle. Generally, each force actuator 402 will be accompanied by a dedicated set of sensors 164, 168 and a dedicated actuator driver 170, i.e., a set of sensors 164,168 and driver 170 for each of the plurality of force actuators 402, although in alternate embodiments fewer of the sensors 164 and/or 168 may be used in the system 150'. In some alternate embodiments, the actuator driver 170 may be provided in the form of a single driver module having multiple different driver sections; one for each of the plurality of actuators 420.

Figure 13:
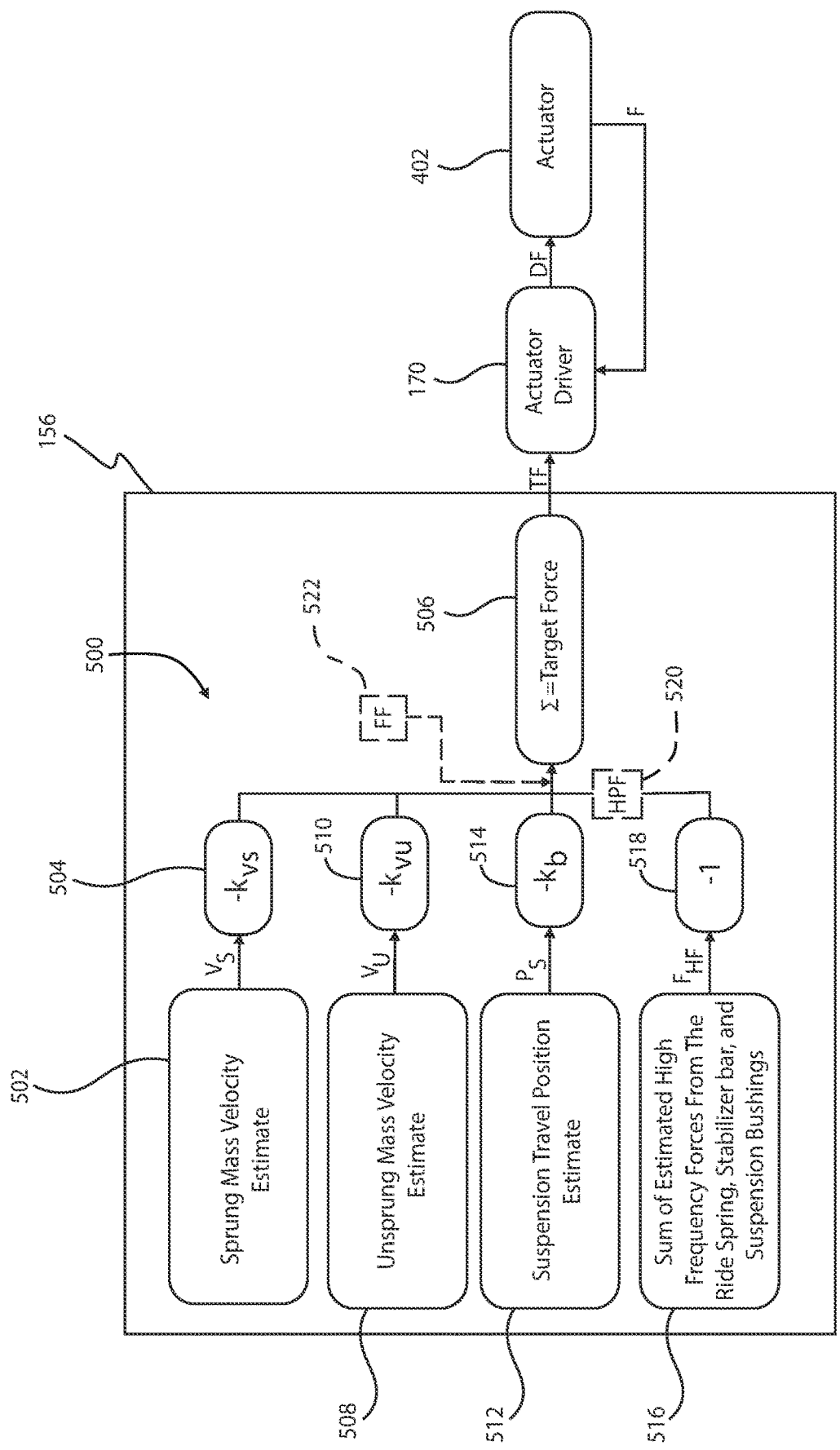
FIG. 13 is a simplified diagram of a portion of the control system depicted in FIG. 11 illustrating an embodiment of a control strategy implemented by the controller to control operation of the force damping actuator depicted in FIGS. 10A and 10B as being coupled to and between the sprung and unsprung masses.

Referring now to FIG. 13, a portion of the control system 150' depicted in FIG. 11 is shown illustrating an embodiment of a control strategy 500 implemented by the controller 156. In the illustrated embodiment, the control strategy 500 is stored in the memory 155 in the form of instructions executable by the controller 156 to control the actuator driver 170 to operatively drive the force actuator 402 in a manner which axially displaces the combination of the rod or shaft 406 and the magnet 410 within the housing 404 so as to dynamically deliver or apply forces between the sprung and unsprung masses 12, 14 to effectively cancel, or at least reduce, relative movement along the z-axis between the sprung and unsprung masses 12, 14. The controller 156 is illustratively operable to execute the control strategy 500 many times per second so as to instantaneously determine control variables and instantaneously control operation of the force actuator 420, i.e., at least as fast as the transient movement of the sprung mass 12 relative to the unsprung mass 14. In embodiments which include the control strategy 500, it will be understood that the controller 156 will, at the same time, e.g., either simultaneously or on a time-sharing basis, execute a control strategy for controlling the active mass damper 110, e.g., by executing the control strategy 200 illustrated by example in FIG. 6 and/or FIG. 7, or one or more variants thereof.

In embodiment illustrated in FIG. 13, the control strategy 500 includes a determination 502 by the controller 156 of the velocity $V_S$ of the sprung mass 12, i.e., the velocity of the sprung mass 12. In the embodiment of the control system 150' illustrated in FIG. 11, the system 150' illustratively includes an acceleration sensor 168, e.g., an accelerometer, coupled to the sprung mass 12, and in such embodiments the controller 156 may be operable at 502 to determine the velocity of the sprung mass 12 by estimating, i.e., computing, the acceleration of the sprung mass 12 based on the acceleration signal produced by the acceleration sensor 168 and then by integrating the acceleration signal to determine the sprung mass velocity. The system 150' further illustratively includes a position or displacement sensor 164 coupled to and between the sprung and unsprung masses 12, 14, and the controller 156 may be alternatively operable at 502 to determine the displacement of the sprung mass 12 based on the displacement or position signal produced by the sensor 164 and then by differentiating the displacement or position signal to determine the sprung mass velocity. In some such embodiments, the processor 156 may optionally determine the velocity via the acceleration sensor 168, and may determine a velocity of the sprung mass 12 as a function of the velocity value determined from the displacement or position signal and the velocity value determined from the acceleration signal. In other embodiments in which the controller 156 is operable to determine the velocity of the sprung mass via the displacement or position signal, the acceleration sensor 168 may be omitted. In any case, the control strategy 500 further includes a multiplication block 504 which multiplies the sprung mass velocity, $V_S$, by a gain factor $-k_{VS}$. In some embodiments, the gain factor $-k_{VS}$ is a constant, although in other embodiments the gain factor $-k_{VS}$ may be or include one or more linear, piecewise linear and/or non-linear functions. The compensated sprung mass velocity, $-k_{VS}V_S$ is provided as an input to a summation block 506.

The illustrated control strategy 500 further illustratively includes a determination 508 by the controller 156 of the velocity, $V_U$, of the unsprung mass 14. In the embodiment of the control strategy 500 illustrated in FIG. 13, the controller 156 may be operable to determine the velocity $V_U$ of the unsprung mass 14 using any one or more of the techniques described above with respect to 208 of the control strategy 200 illustrated in FIG. 6. In any case, the control strategy 500 further includes a multiplication block 510 which multiplies the unsprung mass velocity, $V_U$, by a gain factor $-k_{VU}$. In some embodiments, the gain factor $-k_V$ is a constant, although in other embodiments the gain factor $-k_{VU}$ may be or include one or more linear, piecewise linear and/or non-linear functions. The compensated unsprung mass velocity, $-k_{VU}V_U$ is provided as another input to the summation block 506.

The illustrated control strategy 500 further illustratively includes a determination 512 by the controller 156 of the position or displacement, PS, of the sprung mass 12 relative to the unsprung mass 14. In the embodiment of the control system 150' illustrated in FIG. 11, the system 150 illustratively includes a position or displacement sensor 164, and in such embodiments the controller 156 is operable at 512 to determine the instantaneous position or displacement, PS, of the sprung mass 12 relative to the unsprung mass 14, by estimating, i.e., computing, the sprung mass position or displacement relative to the unsprung mass position based on the position or displacement signal produced by the position or displacement sensor 164. In alternate embodiments, the position or displacement of the sprung mass 12 relative to the unsprung mass 14 may be alternatively or additionally determined or estimated via one or more other sensors as described above with respect to FIG. 3. In any case, the control strategy 500 further includes a multiplication block 514 which multiplies the sprung mass position or displacement, PS, by a gain factor $-kb$. In some embodiments, the gain factor $-kb$ is a constant, although in other embodiments the gain factor $-kb$ may be or include one or more linear, piecewise linear and/or non-linear functions. The compensated sprung mass position or displacement, $-kbPS$ is provided as another input to the summation block 506.

Figure 14:
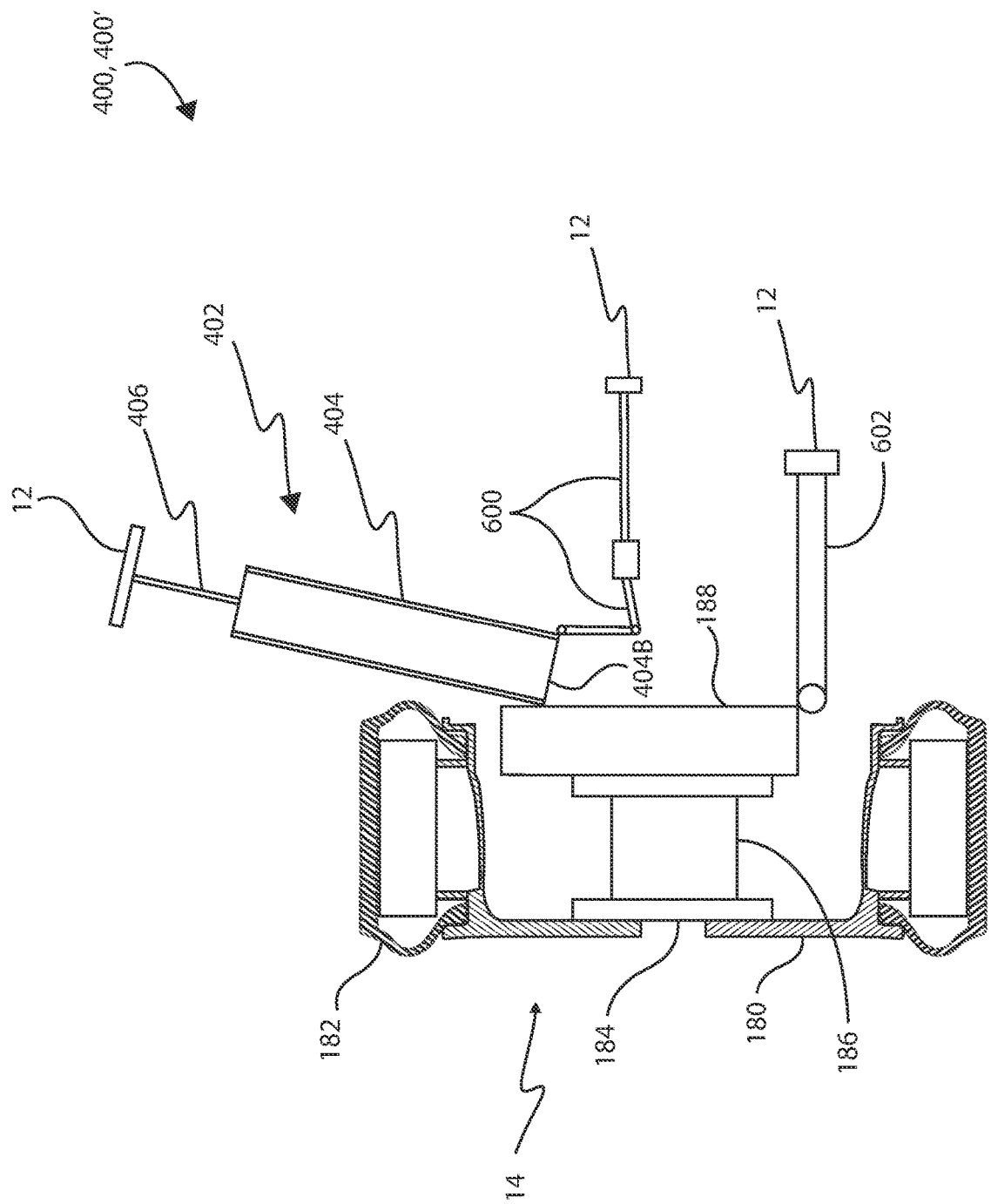
FIG. 14 is a simplified diagram of a portion of the active suspension system shown in FIG. 10A illustrating a number of additional suspension components which contribute to secondary ride forces.

In some embodiments, the illustrated control strategy 500 further illustratively includes a determination 516 by the controller 156 of a sum of estimate high-frequency, secondary ride forces attributable to suspension components including, for example, the ride spring 16, stabilizer bar and suspension bushings. Referring to FIG. 14, for example, a portion of the active suspension system 400, 400' is shown illustrating a number of additional such suspension components which may contribute to secondary ride forces which act on the sprung and unsprung masses 12, 14 with equal and opposite forces. In the illustrated embodiment, a wheel 180 and tire 182 combination is operatively mounted to a conventional wheel bearing 186 via a conventional wheel hub 184 (which may or may not be or include a conventional brake system), and the wheel bearing 186 is, in turn, mounted to a conventional coupling member 188, all as described above with respect to FIGS. 5A-5C. In this embodiment, the unsprung mass 14 includes, but is not limited to, the components 184, 186 and 188. In any case, the bottom end 404B of the housing 404 of the force actuator 402 is operatively mounted to the coupling member 188 and to the sprung mass 12. Also coupled to the housing 404 of the force actuator 402 is one end of a conventional stabilizer bar 600 (and thus, in the illustrated embodiment, coupled to the unsprung mass 14) coupled to the sprung mass 12 via a bushing and connected in a similar manner at the opposite side of the vehicle to the sprung mass 12 via another bushing and connected to the unsprung mass of the suspension on the opposite side of the vehicle, and also one end of a conventional control arm bushing 602 having an opposite end operatively coupled, via a control arm, to the sprung mass 12. In one embodiment, the ride spring 16, the stabilizer bar 600 and the control arm bushing 602 are all characterized so as to determine constants, or dynamic values, for each, e.g., spring constants or dynamic values, wherein each component constant or dynamic value may be multiplied by the position or displacement value, PS, of the sprung mass 12 relative to the unsprung mass 14 determined at 512 to estimate a dynamic force or load component attributable to each component, i.e., a force or load component attributable to the ride spring 16, a force or load component attributable to the stabilizer bar 600 and a force or load component attributable to the control arm bushing 602. The dynamic force or load components so determined for the ride spring 16, the stabilizer bar 600 and the control arm bushing 602 are summed together at 516 to produce an estimated high-frequency force value, FHF. The control strategy 500 further includes a multiplication block 518 which multiplies the high-frequency force value, FHF, by a gain factor. In some embodiments, the gain factor is a constant, e.g., −1, although in other embodiments the gain factor at block 518 may be a constant other than 1, or may be or include one or more linear, piecewise linear and/or non-linear functions. The compensated high-frequency force value, −FHF, is provided as another input to the summation block 506. The delivered force −FHF applied by the force actuator 402 to the sprung mass 12, in embodiments which include blocks 516 and 518, effectively counteracts the secondary ride contribution of the ride spring 16, stabilizer bar 600 and the control arm bushing 602 by counteracting the sum of the estimated forces FHF. In some embodiments, the control strategy 500 includes a high pass filter (HPF) 520 which delivers the force −FHF only at high frequencies. In some such embodiments, the HPF 520 is configured to pass only −FHF signals above about 5 Hz, although in alternate embodiments the high pass frequency may be set higher or lower than 5 Hz.

In the illustrated control strategy 500, the summation block 506 produces a target force signal, TF, according to the relationship $TF = -k_{VS}V_S - k_{VU}V_U - k_b P_S - F_{HF}$, which is provided as a control signal to the actuator driver 170. In some embodiments, as described above, the target force signal, TF, is a variable voltage signal, although in alternate embodiments the target force signal, TF, may be or include a variable current signal. In some alternate embodiments, the control strategy 500 may include one or more feedforward blocks 520, as illustrated in dashed-line representation in FIG. 13, so as to include one or more feedforward components in or as part of the target force signal, TF. Although only a single feedforward block 520 is illustrated in phantom in FIG. 13, it will be understood that the control strategy may include any number of feedforward blocks designed and arranged to include one or more feedforward components in or as part of the compensated sprung mass velocity estimate, the compensated unsprung mass velocity estimate, the compensated suspension travel position estimate, the compensated high-frequency force estimate, and/or the target force signal TF. In some embodiments, the control strategy blocks 516, 518 and 520 may be omitted, and in such embodiments the controller 156 is operable to control the force actuator(s) 402 to control movement of the sprung mass 12 with a damping force acting in a direction opposite to the absolute velocity of the sprung mass 12, i.e., so-called "sky-hook" damping, to assist the active mass damper 110 in the damping of the unsprung mass 14, particularly in the case of large displacements of the unsprung mass 14 which may be too large to be adequately damped by the active mass damper 110 alone, and to control the force in the suspension during extreme compression or rebound movement of the suspension so as to manage kinetic energy and prevent very large loads from being exerted into the body of the motor vehicle or the suspension near the limits of suspension travel. In embodiments which include the control strategy blocks 516, 518, 520, the controller 156 is operable to control the force actuator(s) 402 as just described and to also control the force actuator(s) 402 to deliver force(s) to counteract high-frequency, secondary ride forces of the ride spring 16, stabilizer bar 600 and the control arm bushing 602.

In some embodiments, the actuator driver 170 is illustratively provided in the form of a conventional servo driver which includes a conventional controller for processing the feedback signal produced by the force actuator 402 as briefly described above. The feedback signal, F, illustratively corresponds to a magnitude, amount or other measurable indicator of actuation, e.g., force, being applied by the actuator 402 to cause movement of the combination of the rod or shaft 406 and the body 410, e.g., voltage, current, force, torque, etc., within and relative to the housing 404. In one example of this embodiment, the feedback signal, F, is a variable current signal, although in alternate embodiments the feedback signal, F, may be or include a variable voltage signal. In any case, the actuator driver 170, in embodiments in which it is provided in the form of a conventional servo driver, includes a conventional controller for producing a drive force signal, DF, as a function of the target force signal, TF, produced by the controller 156 and the feedback signal, F. In some embodiments, the controller included in the servo driver includes a conventional error-processing control strategy, such as a proportional-integral (PI), proportional-integral-derivative (PID) or other conventional control strategy, configured to produce the drive force signal, DF, based on an error or difference between the target force signal, TF, and the feedback signal, F. In alternate embodiments, the controller included in the servo driver may include a more sophisticated, conventional control strategy or a custom control strategy.

In some alternate embodiments, the actuator driver 170 may be configured only to produce the drive force signal, DF, to drive the force actuator 402 based solely on the target force signal, TF, i.e., the actuator driver 170 in such embodiments does not include a controller for producing the drive force signal, DF, as a function of the feedback signal, F, and the feedback signal, F, therefore is not supplied to the actuator driver 170. In some such embodiments, the control strategy 500 stored in the memory 155 may include conventional or custom control components for providing a feedback-compensated target force signal, TF, to the actuator driver 170, one non-limiting example of which is shown in dashed-line representation in FIG. 6, the operation of which is described above. In some embodiments, the actuator driver 170, the power source 154 and the force actuator 402 may all modified to recover electrical power during certain operations of the system 150' as described above with respect to FIG. 7.

While this disclosure has been illustrated and described in detail in the foregoing drawings and description, the same is to be considered as illustrative and not restrictive in character, it being understood that only illustrative embodiments thereof have been shown and described and that all changes and modifications that come within the spirit of this disclosure are desired to be protected.

What is claimed is:

1. An active suspension control system for a motor vehicle including a sprung mass, an unsprung mass coupled to the sprung mass and at least one wheel and tire combination coupled to the unsprung mass such that road terrain movement acting on the at least one wheel and tire combination along a z-axis induces movement of the unsprung mass along the z-axis which, in turn, induces movement of the sprung mass also along the z-axis, the active suspension control system comprising:

an active mass damper configured to be mounted to the unsprung mass, the active mass damper including a damper mass and an actuator responsive to a drive signal to cause the damper mass to move relative to the unsprung mass in a direction having a movement component acting along the z-axis, an actuator driver responsive to a control signal to produce the drive signal, at least one sensor configured to produce at least one sensor signal indicative of the component of movement of the unsprung mass along the z-axis, a control circuit, a memory having instructions stored therein executable by the control circuit to cause the control circuit to produce the control signal based on the at least one sensor signal to control movement of the damper mass so as to cancel, or at least reduce, movement of the unsprung mass in response to the road terrain-induced movement acting on the unsprung mass via the at least one wheel and tire combination, and a force actuator coupling the unsprung mass to the sprung mass, the force actuator comprising a magnet coupled directly to one of the sprung mass and the unsprung mass, and an actuator including a housing attached to the other of the sprung mass and the unsprung mass, wherein the magnet of the force actuator is disposed within and movable relative to the force actuator housing, and wherein the actuator of the force actuator is configured to be responsive to a force actuator drive signal to cause the magnet of the force actuator to move relative to the force actuator housing to deliver a force between the sprung and unsprung masses along the z-axis which cancels, or at least reduces, movement of the sprung mass relative to the unsprung mass.

2. The active suspension control system of claim 1, wherein the at least one sensor comprises:

a position sensor configured to produce a position signal corresponding to a position of the damper mass relative to the unsprung mass, and an acceleration sensor configured to produce an acceleration signal corresponding to an acceleration of the unsprung mass along the z-axis, wherein the instructions stored in the memory include instructions executable by the control circuit to determine a velocity of the unsprung mass along the z-axis based on the acceleration signal or the position signal, and to produce the control signal based on the position signal and on the determined velocity of the unsprung mass.

3. The active suspension system of claim 1, further comprising:

a force actuator driver responsive to a force actuator control signal to produce the force actuator drive signal, at least one sensor configured to produce at least one force actuator sensor signal indicative of movement of the sprung mass along the z-axis, and wherein the memory further has instructions stored therein executable by the control circuit, or wherein another memory has instructions stored therein executable by another control circuit, to cause the control circuit or the another control circuit to produce the force actuator control signal based on the at least one force actuator sensor signal to deliver the force so as to cancel, or at least reduce, movement of the sprung mass relative to the unsprung mass.

4. The active suspension control system of claim 3, wherein the at least one sensor configured to produce at least one force actuator sensor signal comprises at least one of a position sensor configured to produce a displacement signal corresponding to relative displacement between the sprung and unsprung masses, and a sprung mass acceleration sensor configured to produce a sprung mass acceleration signal corresponding to an acceleration of the sprung mass along the z-axis, and wherein the instructions stored in the memory or the another memory include instructions executable by the control circuit or the another control circuit to determine a velocity of the sprung mass along the z-axis based on the at least one of the displacement signal and the sprung mass acceleration signal, to determine a relative displacement between the sprung and unsprung masses based on the displacement signal, and to produce the force actuator control signal based at least on the determined velocity of the sprung mass, the determined velocity of the unsprung mass and the relative displacement between the sprung and unsprung masses.

5. The active suspension control system of claim 4, further comprising a plurality of secondary ride components coupled between the sprung and unsprung masses in such a way as to act on the sprung and unsprung masses respectively with equal and opposite forces, and wherein the instructions stored in the memory or the another memory include instructions executable by the control circuit or the another control circuit to estimate a force acting on the sprung mass by each of the plurality of secondary ride components based on the displacement signal, and to produce the force actuator control signal further based on a sum of the estimated forces acting on the sprung mass by the plurality of secondary ride components such that the force actuator delivers a force to the sprung mass which counteracts the sum of the estimated forces.

6. An active suspension control system for a motor vehicle including a sprung mass, an unsprung mass coupled to the sprung mass and at least one wheel and tire combination coupled to the unsprung mass such that road terrain movement acting on the at least one wheel and tire combination along a z-axis induces movement of the unsprung mass along the z-axis which, in turn, induces movement of the sprung mass also along the z-axis, the active suspension control system comprising:

an active mass damper configured to be mounted to the unsprung mass, the active mass damper including a damper mass and an actuator responsive to a drive signal to cause the damper mass to move relative to the unsprung mass in a direction having a movement component acting along the z-axis, an actuator driver responsive to a control signal to produce the drive signal, at least one sensor configured to produce at least one sensor signal indicative of the component of movement of the unsprung mass along the z-axis, a control circuit, a memory having instructions stored therein executable by the control circuit to cause the control circuit to produce the control signal based on the at least one sensor signal to control movement of the damper mass so as to cancel, or at least reduce, movement of the unsprung mass in response to the road terrain-induced movement acting on the unsprung mass via the at least one wheel and tire combination, wherein the active mass damper comprises:

a housing having a bottom end and a top end opposite the bottom end, the housing configured to be mounted to the unsprung mass, a rod received within the housing and coupled at top and bottom ends thereof to respective ones of the top and bottom ends of the housing, wherein the damper mass is slidably received on the rod and the rod is positioned relative to the unsprung mass such that movement of the damper mass along the rod and within the housing has a movement component which acts along the z-axis, a first coil spring received about the rod, and a second coil spring received about the rod, wherein the damper mass is positioned between the first and second coil springs such that a top of the damper mass is biased away from the top end of the housing by the first coil spring and is biased away from the bottom end of the housing by the second coil spring.

7. The active suspension control system of claim 6, wherein the damper mass is a magnet, and wherein the actuator comprises an electrical coil attached to or integral with the housing such that activation of the electrical coil, in response to the drive signal, forces the magnet to move relative to the rod against the bias of the first or second coil spring.

8. An active suspension control system for a motor vehicle including a sprung mass, an unsprung mass coupled to the sprung mass and at least one wheel and tire combination coupled to the unsprung mass such that road terrain movement acting on the at least one wheel and tire combination along a z-axis induces movement of the unsprung mass along the z-axis which, in turn, induces movement of the sprung mass also along the z-axis, the active suspension control system comprising:

an active mass damper configured to be mounted to the unsprung mass, the active mass damper including a damper mass and an actuator responsive to a drive signal to cause the damper mass to move relative to the unsprung mass in a direction having a movement component acting along the z-axis, an actuator driver responsive to a control signal to produce the drive signal, at least one sensor configured to produce at least one sensor signal indicative of the component of movement of the unsprung mass along the z-axis, a control circuit, and a memory having instructions stored therein executable by the control circuit to cause the control circuit to produce the control signal based on the at least one sensor signal to control movement of the damper mass so as to cancel, or at least reduce, movement of the unsprung mass in response to the road terrain-induced movement acting on the unsprung mass via the at least one wheel and tire combination, wherein the system does not include a shock absorber coupled to and between the unsprung mass and the sprung mass, and wherein the system includes an air spring damper in lieu of the shock absorber, the air spring damper coupling the unsprung mass to the sprung mass.

9. An active suspension control system for a motor vehicle including a sprung mass, an unsprung mass coupled to the sprung mass and at least one wheel and tire combination coupled to the unsprung mass such that road terrain movement acting on the at least one wheel and tire combination along a z-axis induces movement of the unsprung mass along the z-axis which, in turn, induces movement of the sprung mass also along the z-axis, the active suspension control system comprising:

an active mass damper configured to be mounted to the unsprung mass, the active mass damper including a damper mass and an actuator responsive to a drive signal to cause the damper mass to move relative to the unsprung mass in a direction having a movement component acting along the z-axis, an actuator driver responsive to a control signal to produce the drive signal, at least one sensor configured to produce at least one sensor signal indicative of the component of movement of the unsprung mass along the z-axis, a control circuit, and a memory having instructions stored therein executable by the control circuit to cause the control circuit to produce the control signal based on the at least one sensor signal to control movement of the damper mass so as to cancel, or at least reduce, movement of the unsprung mass in response to the road terrain-induced movement acting on the unsprung mass via the at least one wheel and tire combination, wherein the system does not include a ride spring coupled to and between the unsprung mass and the sprung mass, and wherein the system includes a multi-chamber air spring damper in lieu of the ride spring, the multi-chamber air spring damper coupling the unsprung mass to the sprung mass.

10. An active suspension control system for a motor vehicle including a sprung mass, an unsprung mass coupled to the sprung mass and at least one wheel and tire combination coupled to the unsprung mass such that road terrain movement acting on the at least one wheel and tire combination along a z-axis induces movement of the unsprung mass along the z-axis which, in turn, induces movement of the sprung mass also along the z-axis, the active suspension control system comprising:

an active mass damper configured to be mounted to the unsprung mass, the active mass damper including a damper mass and an actuator responsive to a drive signal to cause the damper mass to move relative to the unsprung mass in a direction having a movement component acting along the z-axis, an actuator driver responsive to a control signal to produce the drive signal, means for determining at least one parameter indicative of movement of the unsprung mass along the z-axis, and a control circuit configured to produce the control signal based on the at least one determined parameter to control movement of the damper mass so as to cancel, or at least reduce, movement of the unsprung mass in response to the road terrain-induced movement acting on the unsprung mass via the at least one wheel and tire combination, and a force actuator coupling the unsprung mass to the sprung mass, the force actuator comprising a magnet coupled directly to one of the sprung mass and the unsprung mass, and an actuator including a housing attached to the other of the sprung mass and the unsprung mass, wherein the magnet of the force actuator is disposed within and movable relative to the force actuator housing, and wherein the actuator of the force actuator is configured to be responsive to a force actuator drive signal to cause the force actuator magnet to move relative to the force actuator housing to deliver a force between the sprung and unsprung masses along the z-axis which cancels, or at least reduces, movement of the sprung mass relative to the unsprung mass.

11. The active suspension control system of claim 10, further comprising:

a force actuator driver responsive to a force actuator control signal to produce the force actuator drive signal, at least one sensor configured to produce at least one force actuator sensor signal indicative of movement of the sprung mass along the z-axis, and wherein the memory further has instructions stored therein executable by the control circuit, or wherein another memory has instructions stored therein executable by another control circuit, to cause the control circuit or the another control circuit to produce the force actuator control signal based on the at least one force actuator sensor signal to deliver the force so as to cancel, or at least reduce, movement of the sprung mass relative to the unsprung mass.

12. The active suspension system of claim 10, wherein the force actuator further includes a rod or shaft having one end coupled directly to the one of the sprung mass and the unsprung mass, and an opposite end at or adjacent to which the magnet of the force actuator is affixed such that the rod or shaft and the magnet of the force actuator are together movable within and relative to the force actuator housing.

13. The active suspension system of claim 10, wherein the actuator of the force actuator further comprises an electrical coil attached to or integral with the force actuator housing such that activation of the electrical coil of the force actuator, in response to the force actuator drive signal, forces the force actuator magnet to move within and relative to the force actuator housing, wherein the force actuator housing is cylindrical, and wherein the electrical coil of the force actuator is attached to or integral with at least a portion of a sidewall of the force actuator housing between the top end and the bottom end of the force actuator housing, the electrical coil of the force actuator extending at least partially about a periphery of the force actuator housing.

14. The active suspension control system of claim 10, wherein the at least one sensor configured to produce at least one force actuator sensor signal comprises at least one of a position sensor configured to produce a displacement signal corresponding to relative displacement between the sprung and unsprung masses, and a sprung mass acceleration sensor configured to produce a sprung mass acceleration signal corresponding to an acceleration of the sprung mass along the z-axis, and wherein the instructions stored in the memory or the another memory include instructions executable by the control circuit or the another control circuit to determine a velocity of the sprung mass along the z-axis based on the at least one of the displacement signal and the sprung mass acceleration signal, to determine a relative displacement between the sprung and unsprung masses based on the displacement signal, and to produce the force actuator control signal based at least on the determined velocity of the sprung mass, the determined velocity of the unsprung mass and the relative displacement between the sprung and unsprung masses.

15. The active suspension control system of claim 14, further comprising a plurality of secondary ride components coupled between the sprung and unsprung masses in such a way as to act on the sprung and unsprung masses respectively with equal and opposite forces, and wherein the instructions stored in the memory or the another memory include instructions executable by the control circuit or the another control circuit to estimate a force acting on the sprung mass by each of the plurality of secondary ride components based on the displacement signal, and to produce the force actuator control signal further based on a sum of the estimated forces acting on the sprung mass by the plurality of secondary ride components such that the force actuator delivers a force to the sprung mass which counteracts the sum of the estimated forces.

16. An active damper for a motor vehicle including a sprung mass, an unsprung mass coupled to the sprung mass and at least one wheel and tire combination coupled to the unsprung mass such that road terrain movement acting on the at least one wheel and tire combination along a z-axis induces movement of the unsprung mass along the z-axis which, in turn, induces movement of the sprung mass also along the z-axis, the active damper comprising:

a housing configured to be mounted to the unsprung mass, a damper mass received within the housing and movable within the housing in a direction, relative to the unsprung mass, which has a movement component acting along the z-axis, and an actuator configured to be responsive to a drive signal to cause the damper mass to within the housing so as to cancel, or at least reduce, movement of the unsprung mass in response to the road terrain-induced movement acting on the unsprung mass via the at least one wheel and tire combination, wherein the housing has a top end and a bottom end opposite the top end, and wherein the active mass damper further comprises:

a rod received within the housing and coupled at top and bottom ends thereof to respective ones of the top and bottom ends of the housing, the rod positioned relative to the unsprung mass such that movement of the rod within the housing has a movement component which acts along the z-axis, a first coil spring received about the rod, and a second coil spring received about the rod, wherein the damper mass is slidably received on the rod between the first and second coil springs such that a top of the damper mass is biased away from the top end of the housing by the first coil spring and is biased away from the bottom end of the housing by the second coil spring.

17. The active damper of claim 16, wherein the damper mass is a magnet, wherein actuator comprises an electrical coil attached to or integral with the housing such that activation of the electrical coil, in response to the drive signal, forces the magnet to move relative to the rod against the bias of the first or second coil spring, wherein the housing is cylindrical, and wherein the electrical coil is attached to or integral with at least a portion of a sidewall of the housing between the top end and the bottom end of the housing, the electrical coil extending at least partially about a periphery of the housing.

* * * * *